(12) United States Patent
Choi et al.

(10) Patent No.: US 12,306,384 B2
(45) Date of Patent: May 20, 2025

(54) SMALL WIDE-ANGLE LENS SYSTEM

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seong Jun Bae, Gyeonggi-do (KR); Chae Yeong Kim, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 609 days.

(21) Appl. No.: 17/805,210

(22) Filed: Jun. 2, 2022

(65) Prior Publication Data
US 2022/0390717 A1 Dec. 8, 2022

(30) Foreign Application Priority Data
Jun. 7, 2021 (KR) .................. 10-2021-0073388

(51) Int. Cl.
*G02B 13/00* (2006.01)
*G02B 9/64* (2006.01)
*G02B 13/06* (2006.01)

(52) U.S. Cl.
CPC ........... *G02B 13/0045* (2013.01); *G02B 9/64* (2013.01); *G02B 13/06* (2013.01)

(58) Field of Classification Search
CPC ....... G02B 13/0045; G02B 9/64; G02B 13/06
See application file for complete search history.

(56) References Cited

U.S. PATENT DOCUMENTS

2024/0377616 A1* 11/2024 Choi ..................... G03B 17/12

FOREIGN PATENT DOCUMENTS

WO    WO-2023239161 A1 * 12/2023 ......... G02B 13/0045

* cited by examiner

*Primary Examiner* — Nathanael R Briggs
(74) *Attorney, Agent, or Firm* — Mendelsohn Dunleavy, P.C.

(57) ABSTRACT

Disclosed is a small wide-angle lens system including a first lens, a second lens, a third lens, a fourth lens, a fifth lens, a sixth lens, a seventh lens, an eighth lens, and a ninth lens sequentially arranged from an object, wherein the first lens has a convex object-side surface, the third lens has a negative refractive power, the fourth lens has a concave image-side surface, the sixth lens has a concave object-side surface and a concave image-side surface, the ninth lens has a negative refractive power and a concave object-side surface, all surfaces of the first to ninth lenses are aspherical surfaces, the refractive power P1 of the first lens satisfies $|P1|<0.01$, and Fno of the lens system satisfies $Fno<1.6$.

20 Claims, 22 Drawing Sheets

PRIOR ART

FIG. 13A

TABLE 2

| Surface | 2 | Stop | 4 | 5 | 6 | 7 | 8 | 9 | 10 |
|---|---|---|---|---|---|---|---|---|---|
| Y Radius | 2.94823.E+00 | 2.80290.E+00 | 2.42387.E+00 | 2.14309.E+01 | 2.52208.E+01 | 6.22277.E+00 | 1.35534.E+01 | 1.59215.E+01 | -1.61422.E+03 |
| Normalization Radius | 1.76418.E+00 | 1.69713.E+00 | 1.68191.E+00 | 1.56708.E+00 | 1.59050.E+00 | 1.84972.E+00 | 1.51862.E+00 | 2.43663.E+00 | 2.02041.E+00 |
| K | -2.66109.E+00 | -1.32132.E+00 | -4.28790.E-01 | -1.32862.E-02 | 7.95767.E+01 | 1.29844.E+01 | -2.21410.E-01 | 0.00000.E+00 | 0.00000.E+00 |
| 4th Qcon Coefficient | -1.25226.E-01 | -3.93292.E-01 | -2.09946.E-01 | -6.71591.E-02 | -8.52050.E-04 | -3.61177.E-02 | -2.41199.E-01 | -5.34117.E-01 | 2.61819.E-02 |
| 6th Qcon Coefficient | -2.04105.E-02 | 3.46853.E-02 | 4.70988.E-02 | 1.26073.E-02 | 1.75820.E-02 | -1.77524.E-02 | -8.97780.E-03 | 1.76944.E-01 | 3.01913.E-02 |
| 8th Qcon Coefficient | 2.45747.E-03 | -1.00819.E-03 | -8.76935.E-04 | -4.00166.E-03 | -5.90969.E-03 | -5.19419.E-03 | 3.77462.E-03 | -3.88693.E-02 | -1.26119.E-02 |
| 10th Qcon Coefficient | 1.08996.E-03 | -5.63281.E-04 | -1.39136.E-03 | 2.50799.E-03 | 3.79317.E-03 | 9.00704.E-03 | 1.21872.E-03 | -6.97206.E-02 | -6.93105.E-03 |
| 12th Qcon Coefficient | -1.89129.E-04 | 8.79036.E-05 | 2.08640.E-04 | -8.25515.E-04 | -1.52521.E-03 | 7.28140.E-03 | 1.31445.E-04 | 1.26627.E-02 | 4.11213.E-03 |
| 14th Qcon Coefficient | -7.55054.E-05 | 3.73121.E-05 | 9.38399.E-05 | 1.39760.E-04 | 2.13137.E-04 | 7.17684.E-03 | -2.73756.E-05 | 4.15384.E-02 | -2.81106.E-03 |
| 16th Qcon Coefficient | -9.96949.E-07 | -3.12466.E-05 | -3.41796.E-05 | -1.42483.E-04 | -1.37695.E-04 | 2.93532.E-03 | 3.61182.E-05 | 4.24951.E-02 | 9.79931.E-04 |
| 18th Qcon Coefficient | -2.91862.E-06 | 5.50599.E-06 | 5.82176.E-06 | 9.68347.E-05 | 1.23549.E-04 | 8.16783.E-04 | 1.37813.E-05 | 2.04656.E-02 | -4.39266.E-04 |
| 20th Qcon Coefficient | 4.50142.E-06 | 4.48588.E-07 | 1.95532.E-06 | -1.80365.E-05 | -3.65475.E-05 | 1.58728.E-05 | 1.58310.E-05 | 6.16989.E-03 | 1.96397.E-04 |
| 22th Qcon Coefficient | - | - | - | - | - | - | - | - | - |
| 24th Qcon Coefficient | - | - | - | - | - | - | - | - | - |
| 26th Qcon Coefficient | - | - | - | - | - | - | - | - | - |
| 28th Qcon Coefficient | - | - | - | - | - | - | - | - | - |
| 30th Qcon Coefficient | - | - | - | - | - | - | - | - | - |

FIG. 13B

TABLE 2 (Cont'd)

| Surface | 11 | 12 | 13 | 14 | 15 | 16 | 17 | 18 | 19 |
|---|---|---|---|---|---|---|---|---|---|
| Y Radius | 1.61007.E+01 | 2.00000.E+02 | -1.08242.E+01 | 1.63115.E+01 | -6.67083.E+01 | 3.14243.E+01 | 5.60972.E+00 | -3.38484.E+00 | 2.71480.E+00 |
| Normalization Radius | 2.26205.E+00 | 2.05702.E+00 | 2.19916.E+00 | 2.38350.E+00 | 3.32734.E+00 | 3.31376.E+00 | 3.71451.E+00 | 4.38759.E+00 | 4.93685.E+00 |
| K | 0.00000.E+00 | 7.78764.E+02 | 7.96302.E+00 | -9.89420.E-01 | 3.46665.E+00 | 0.00000.E+00 | 0.00000.E+00 | 6.09069.E+01 | -1.18647.E+01 |
| 4th Qcon Coefficient | -2.88713.E-01 | -7.75619.E-02 | -4.51024.E-02 | -3.97585.E-01 | -7.43626.E-01 | -4.49754.E+00 | -2.58431.E+00 | -1.26358.E+00 | -3.26418.E+00 |
| 6th Qcon Coefficient | 7.19280.E-02 | -2.51111.E-02 | 2.27144.E-02 | -1.24190.E-01 | 2.19191.E-01 | 1.08249.E-01 | 4.61963.E-01 | 1.09862.E+00 | 4.71388.E-01 |
| 8th Qcon Coefficient | -5.81386.E-03 | -4.49784.E-03 | 5.10847.E-03 | 5.10261.E-02 | 1.87827.E-01 | -6.56815.E-02 | -4.22960.E-03 | -5.85043.E-01 | -3.32101.E-01 |
| 10th Qcon Coefficient | 4.62101.E-03 | 1.81154.E-03 | 2.91731.E-03 | -3.07155.E-03 | 1.40576.E-02 | -9.60269.E-02 | -5.73037.E-02 | 2.45261.E-01 | 2.74955.E-01 |
| 12th Qcon Coefficient | 4.07443.E-03 | 5.07588.E-04 | 1.33956.E-03 | 7.72330.E-03 | 4.36388.E-02 | 3.22778.E-02 | -1.43935.E-02 | -8.71405.E-02 | -3.99301.E-02 |
| 14th Qcon Coefficient | -1.25575.E-03 | -9.19747.E-04 | -1.86243.E-03 | -9.09902.E-04 | -4.26844.E-02 | 5.24156.E-02 | 1.36175.E-02 | 2.56056.E-02 | 8.39875.E-02 |
| 16th Qcon Coefficient | 3.62944.E-04 | 2.26828.E-04 | 8.73113.E-05 | 3.76768.E-04 | -3.80403.E-02 | 3.82213.E-02 | 8.65205.E-03 | -2.19685.E-02 | 3.69170.E-02 |
| 18th Qcon Coefficient | -1.11150.E-03 | 6.51691.E-05 | 1.31633.E-04 | -2.74745.E-04 | -2.02679.E-02 | 7.60173.E-03 | -9.58093.E-03 | -2.58430.E-03 | 2.51366.E-02 |
| 20th Qcon Coefficient | -8.52537.E-05 | 3.11840.E-06 | -1.61733.E-05 | -1.53097.E-04 | -8.91476.E-04 | 3.59217.E-03 | 1.20402.E-03 | -2.08263.E-03 | -2.48569.E-03 |
| 22th Qcon Coefficient | - | - | - | - | - | -2.35265.E-03 | -2.54277.E-04 | -1.15719.E-03 | -1.04734.E-03 |
| 24th Qcon Coefficient | - | - | - | - | - | -3.54373.E-03 | -2.85674.E-03 | -6.05821.E-03 | -1.53462.E-02 |
| 26th Qcon Coefficient | - | - | - | - | - | 1.03492.E-03 | -1.77253.E-03 | -1.17453.E-03 | -1.74611.E-02 |
| 28th Qcon Coefficient | - | - | - | - | - | 2.41800.E-03 | -2.43927.E-03 | -4.30567.E-03 | -1.12865.E-02 |
| 30th Qcon Coefficient | - | - | - | - | - | 6.85905.E-04 | -1.43555.E-03 | -1.62027.E-03 | -3.10180.E-03 |

FIG. 14A

TABLE 4

| Surface | 2 | Stop | 4 | 5 | 6 | 7 | 8 | 9 | 10 |
|---|---|---|---|---|---|---|---|---|---|
| Y Radius | 3.00577.E+00 | 2.83422.E+00 | 2.46037.E+00 | 2.48406.E+01 | 2.78491.E+01 | 6.42499.E+00 | 8.05693.E+00 | 1.22253.E+01 | -8.89486.E+00 |
| Normalization Radius | 1.76418.E+00 | 1.69713.E+00 | 1.68191.E+00 | 1.56708.E+00 | 1.59050.E+00 | 1.84972.E+00 | 1.46332.E+00 | 2.43663.E+00 | 2.02041.E+00 |
| K | -2.97251.E+00 | -1.62301.E+00 | -4.34275.E-01 | -1.34380.E-02 | 6.15887.E+00 | 1.35612.E+01 | 0.00000.E+00 | 0.00000.E+00 | 0.00000.E+00 |
| 4th Qcon Coefficient | -1.32357.E-01 | -4.04855.E-01 | -2.10212.E-01 | -5.14992.E-02 | -1.90449.E-03 | -2.92372.E-02 | -1.91716.E-01 | -4.97573.E-01 | 5.45726.E-02 |
| 6th Qcon Coefficient | -2.25657.E-02 | 3.08801.E-02 | 4.67699.E-02 | 1.77913.E-02 | 1.64365.E-02 | -1.70328.E-02 | -3.55382.E-03 | 1.85590.E-01 | 9.78007.E-03 |
| 8th Qcon Coefficient | 4.86434.E-04 | -2.53850.E-03 | -9.84563.E-04 | -4.42629.E-03 | -5.76589.E-03 | -6.88616.E-03 | 4.18327.E-04 | -4.14229.E-02 | -6.39193.E-03 |
| 10th Qcon Coefficient | 4.91752.E-04 | -7.90224.E-04 | -1.50456.E-03 | 2.41487.E-03 | 3.61358.E-03 | 3.00391.E-03 | 4.75838.E-04 | -7.07545.E-02 | -5.63272.E-03 |
| 12th Qcon Coefficient | -7.98172.E-05 | 1.77213.E-04 | 2.66513.E-04 | -9.01190.E-04 | -1.47100.E-03 | 8.20402.E-03 | 2.09965.E-04 | 8.74878.E-03 | 2.58308.E-03 |
| 14th Qcon Coefficient | -4.68166.E-05 | 2.62786.E-05 | 4.42069.E-05 | 1.30802.E-04 | 2.14375.E-04 | 8.49877.E-03 | -3.16708.E-05 | 4.74454.E-02 | -1.66297.E-03 |
| 16th Qcon Coefficient | 1.67750.E-05 | -2.25383.E-05 | -2.61184.E-05 | -1.66018.E-04 | -1.62222.E-04 | 4.18331.E-03 | 1.06645.E-05 | 4.23475.E-02 | -5.18602.E-05 |
| 18th Qcon Coefficient | -1.13924.E-05 | 8.78307.E-06 | 6.93073.E-06 | 1.19205.E-04 | 1.59719.E-04 | 1.40932.E-03 | -1.30155.E-05 | 1.93236.E-02 | -1.16741.E-04 |
| 20th Qcon Coefficient | 4.50142.E-06 | -1.44863.E-06 | 8.80594.E-07 | -2.22467.E-05 | -4.18710.E-05 | 1.87688.E-04 | 5.05742.E-06 | 4.66943.E-03 | 2.99951.E-04 |
| 22th Qcon Coefficient | | | | | | | | | |
| 24th Qcon Coefficient | | | | | | | | | |
| 26th Qcon Coefficient | | | | | | | | | |
| 28th Qcon Coefficient | | | | | | | | | |
| 30th Qcon Coefficient | | | | | | | | | |

FIG. 14B
TABLE 4 (Cont'd)

| Surface | 11 | 12 | 13 | 14 | 15 | 16 | 17 | 18 | 19 |
|---|---|---|---|---|---|---|---|---|---|
| Y Radius | -1.00689.E+01 | -6.19393.E+00 | -7.19987.E+00 | 9.75811.E+01 | -8.84193.E+00 | 3.15352.E+00 | 5.46643.E+00 | -3.47066.E+01 | 2.86669.E+00 |
| Normalization Radius | 2.26205.E+00 | 2.03137.E+00 | 2.13499.E+00 | 2.38350.E+00 | 3.32734.E+00 | 3.28326.E+00 | 3.71451.E+00 | 4.38759.E+00 | 4.93685.E+00 |
| K | 0.00000.E+00 | -1.57432.E-01 | 3.01020.E-01 | -9.89420.E-01 | 3.46665.E+00 | 0.00000.E+00 | 0.00000.E+00 | 6.61746.E+01 | -1.58904.E+01 |
| 4th Qcon Coefficient | -1.83830.E-01 | -1.39378.E-03 | 1.17287.E-04 | -3.70778.E-01 | -4.56365.E-01 | -4.25906.E-01 | -2.73524.E+00 | -1.37634.E+00 | -2.21719.E+00 |
| 6th Qcon Coefficient | 5.87053.E-02 | -1.82915.E-03 | 1.53203.E-03 | -1.18236.E-01 | 2.46090.E-01 | 1.79177.E-01 | 6.17853.E-01 | 1.15475.E+00 | 4.50493.E-01 |
| 8th Qcon Coefficient | 2.65481.E-03 | -5.02539.E-04 | 4.51827.E-04 | 4.15023.E-02 | 1.12293.E-01 | -1.27524.E-01 | -5.86388.E-02 | -5.65778.E-01 | -1.07718.E-01 |
| 10th Qcon Coefficient | -2.74726.E-03 | -8.95346.E-05 | 7.00860.E-05 | -4.08647.E-03 | 3.23184.E-01 | -9.47254.E-02 | -6.62766.E-02 | 2.38186.E-01 | 1.66205.E-01 |
| 12th Qcon Coefficient | 4.77565.E-03 | -9.78873.E-06 | 6.49516.E-06 | 6.13487.E-03 | 5.78399.E-02 | 3.32768.E-02 | -2.18631.E-02 | -9.29904.E-02 | 1.21785.E-02 |
| 14th Qcon Coefficient | -1.08380.E-03 | -5.79898.E-07 | 3.85526.E-07 | -3.30158.E-04 | -4.33432.E-02 | 6.33168.E-02 | 2.04627.E-02 | 3.82411.E-02 | 4.10216.E-02 |
| 16th Qcon Coefficient | 2.27380.E-03 |  |  | 6.77678.E-04 | -5.01708.E-02 | 2.28084.E-02 | -6.29581.E-03 | -1.89211.E-02 | -1.14713.E-02 |
| 18th Qcon Coefficient | 1.35365.E-03 |  |  | -3.90806.E-04 | -2.11844.E-02 | 3.40142.E-03 | -1.02891.E-03 | 1.01546.E-02 | -7.20690.E-04 |
| 20th Qcon Coefficient | 8.16804.E-04 |  |  | -6.32867.E-05 | -4.66587.E-04 | 1.57492.E-03 | 5.30409.E-04 | -7.39024.E-03 | -8.88470.E-03 |
| 22th Qcon Coefficient |  |  |  |  |  |  |  |  |  |
| 24th Qcon Coefficient |  |  |  |  |  |  |  |  |  |
| 26th Qcon Coefficient |  |  |  |  |  |  |  |  |  |
| 28th Qcon Coefficient |  |  |  |  |  |  |  |  |  |
| 30th Qcon Coefficient |  |  |  |  |  |  |  |  |  |

FIG. 15A

TABLE 6

| Surface | 2 | Stop | 4 | 5 | 6 | 7 | 8 | 9 | 10 |
|---|---|---|---|---|---|---|---|---|---|
| Y Radius | 2.98363.E+00 | 2.86232.E+00 | 2.46501.E+00 | 1.98221.E+00 | 2.23149.E+01 | 6.44548.E+00 | 6.46628.E+00 | 6.45525.E+00 | 9.68303.E+01 |
| Normalization Radius | 1.76418.E+00 | 1.69713.E+00 | 1.68191.E+00 | 1.56708.E+00 | 1.59050.E+00 | 1.84972.E+00 | 1.46332.E+00 | 2.43663.E+00 | 2.02041.E+00 |
| K | -3.20020.E+00 | -1.69077.E+00 | -4.34135.E-01 | -8.94271.E+00 | 8.17534.E+01 | 1.33582.E+01 | 0.00000.E+00 | 0.00000.E+00 | 0.00000.E+00 |
| 4th Qcon Coefficient | -1.40066.E-01 | -4.07702.E-01 | -2.10787.E-01 | -5.56097.E-02 | -5.33183.E-03 | -2.91489.E-02 | -1.93458.E-01 | -5.94917.E-01 | 4.32880.E-02 |
| 6th Qcon Coefficient | -2.58259.E-02 | 2.94690.E-02 | 4.78574.E-02 | 1.72957.E-02 | 1.37518.E-02 | -1.86480.E-02 | -4.36617.E-03 | 1.85318.E-01 | 9.41742.E-03 |
| 8th Qcon Coefficient | 1.30575.E-03 | -2.13144.E-03 | -1.31584.E-03 | -4.75623.E-03 | -5.83144.E-03 | -5.64053.E-03 | -1.91869.E-04 | -2.49457.E-02 | -6.45496.E-03 |
| 10th Qcon Coefficient | 7.78247.E-04 | -4.50473.E-04 | -1.17503.E-03 | 2.30779.E-03 | 3.40983.E-03 | 8.05860.E-03 | 6.36215.E-04 | -7.46035.E-02 | -2.70176.E-03 |
| 12th Qcon Coefficient | -1.27344.E-04 | 5.24185.E-05 | 1.72612.E-04 | -7.94983.E-04 | -1.34464.E-03 | 7.19086.E-03 | 1.89378.E-04 | 5.51299.E-03 | -5.44654.E-04 |
| 14th Qcon Coefficient | -4.51953.E-05 | 5.07875.E-05 | 7.91821.E-05 | 1.56532.E-04 | 1.94762.E-04 | 8.16559.E-03 | -6.94621.E-06 | 5.04747.E-02 | -7.48185.E-04 |
| 16th Qcon Coefficient | 6.48131.E-06 | -2.10922.E-05 | -1.38715.E-05 | -1.50545.E-04 | -1.05373.E-04 | 4.19842.E-03 | 6.38452.E-06 | 4.13026.E-02 | 1.52873.E-04 |
| 18th Qcon Coefficient | -6.44615.E-06 | 4.12365.E-06 | 4.17175.E-06 | 1.05392.E-04 | 1.14502.E-04 | 1.48012.E-03 | -1.06002.E-05 | 1.84565.E-02 | -1.94456.E-04 |
| 20th Qcon Coefficient | 4.50142.E-06 | -2.61667.E-07 | 2.12357.E-07 | -2.02919.E-05 | -3.67186.E-05 | 2.64994.E-04 | 4.82068.E-06 | 4.63270.E-03 | 2.37579.E-04 |
| 22th Qcon Coefficient | | | | | | | | | |
| 24th Qcon Coefficient | | | | | | | | | |
| 26th Qcon Coefficient | | | | | | | | | |
| 28th Qcon Coefficient | | | | | | | | | |
| 30th Qcon Coefficient | | | | | | | | | |

FIG. 15B
TABLE 6 (Cont'd)

| Surface | 11 | 12 | 13 | 14 | 15 | 16 | 17 | 18 | 19 |
|---|---|---|---|---|---|---|---|---|---|
| Y Radius | -6.28187.E+01 | -1.13843.E+01 | -1.05509.E+01 | 2.02131.E+01 | -2.55180.E+01 | 3.17808.E+00 | 5.53260.E+00 | -3.55298.E+01 | 2.75961.E+00 |
| Normalization Radius | 2.26205.E+00 | 2.11002.E+00 | 2.32261.E+00 | 2.38350.E+00 | 3.32734.E+00 | 3.28326.E+00 | 3.71451.E+00 | 4.38759.E+00 | 4.93665.E+00 |
| K | 0.00000.E+00 | 1.53188.E+00 | 1.59549.E+00 | -9.89420.E-01 | 3.46665.E+00 | 0.00000.E+00 | 0.00000.E+00 | 6.67072.E+01 | -1.40615.E+01 |
| 4th Qcon Coefficient | -2.13245.E-01 | -7.01300.E-02 | -5.50881.E-03 | -3.47582.E-01 | -5.01755.E-01 | -4.29237.E+00 | -2.71225.E+00 | -1.34929.E+00 | -2.89582.E+00 |
| 6th Qcon Coefficient | 7.87719.E-02 | -2.43669.E-02 | 9.97043.E-03 | -1.19960.E-01 | 2.59726.E-01 | 1.86163.E-01 | 4.74739.E-01 | 1.11767.E+00 | 4.89376.E-01 |
| 8th Qcon Coefficient | -4.72525.E-03 | -6.60449.E-03 | 6.54691.E-03 | 4.88946.E-02 | 1.74541.E-01 | -1.07428.E-01 | -8.96652.E-03 | -5.70054.E-01 | -2.48197.E-01 |
| 10th Qcon Coefficient | -3.32068.E-03 | -8.76002.E-04 | 2.17735.E-03 | -1.10203.E-03 | 6.88857.E-03 | -1.20987.E-01 | -6.72728.E-02 | 2.51983.E-01 | 1.22136.E-01 |
| 12th Qcon Coefficient | 6.45686.E-03 | 2.04648.E-03 | 2.89643.E-03 | 6.30894.E-03 | 4.79780.E-02 | 5.00308.E-02 | -8.41482.E-03 | -9.48417.E-02 | -1.63742.E-02 |
| 14th Qcon Coefficient | -6.83021.E-04 | -1.28604.E-04 | -6.26234.E-04 | -1.69801.E-03 | -3.63332.E-02 | 6.27950.E-02 | 1.33492.E-02 | 3.85267.E-02 | 5.92117.E-02 |
| 16th Qcon Coefficient | 2.34981.E-03 | 5.51142.E-06 | 3.94714.E-06 | 4.96279.E-04 | -4.09623.E-02 | 2.44838.E-02 | -1.04904.E-02 | -3.15680.E-02 | -3.75324.E-03 |
| 18th Qcon Coefficient | 1.78532.E-03 | -3.21609.E-04 | -1.24782.E-04 | -1.33737.E-04 | -2.57379.E-02 | 4.31140.E-03 | 1.91973.E-03 | 1.53627.E-02 | 7.42454.E-03 |
| 20th Qcon Coefficient | 1.35512.E-03 | -7.35047.E-06 | -8.59124.E-05 | -6.24237.E-05 | -2.76945.E-03 | 1.76298.E-03 | -2.29518.E-04 | -7.06468.E-03 | -1.17304.E-02 |
| 22th Qcon Coefficient | - | - | - | - | - | - | - | - | - |
| 24th Qcon Coefficient | - | - | - | - | - | - | - | - | - |
| 26th Qcon Coefficient | - | - | - | - | - | - | - | - | - |
| 28th Qcon Coefficient | - | - | - | - | - | - | - | - | - |
| 30th Qcon Coefficient | - | - | - | - | - | - | - | - | - |

FIG. 16A
TABLE 8

| Surface | 2 | Stop | 4 | 5 | 6 | 7 | 8 | 9 | 10 |
|---|---|---|---|---|---|---|---|---|---|
| Y Radius | 3.05363E+00 | 3.01420E+00 | 2.63552E+00 | -5.45712E+01 | -3.65511E+01 | 6.87600E+00 | 1.15111E+01 | 2.66680E+01 | -1.12086E+02 |
| Normalization Radius | 1.76418E+00 | 1.69713E+00 | 1.68191E+00 | 1.56708E+00 | 1.59050E+00 | 1.84972E+00 | 1.46332E+00 | 2.43663E+00 | 2.02041E+00 |
| K | -3.45702E+00 | -1.48585E+00 | -3.98152E-01 | -1.32848E-02 | 7.95767E+01 | 1.41356E+01 | 0.00000E+00 | 0.00000E+00 | 0.00000E+00 |
| 4th Qcon Coefficient | -1.46241E-01 | -4.01795E-01 | -2.07599E-01 | -5.77575E-02 | 6.88909E-03 | -3.40113E-02 | -1.91833E-01 | -4.98109E-01 | 2.72003E-02 |
| 6th Qcon Coefficient | -2.78718E-02 | 2.85583E-02 | 4.92260E-02 | 1.70508E-02 | 1.07505E-02 | -1.77774E-02 | -1.72584E-03 | 1.75449E-01 | 2.66273E-02 |
| 8th Qcon Coefficient | 9.15796E-04 | -2.44299E-03 | -8.54544E-04 | -3.23671E-03 | -5.06839E-03 | -2.76671E-03 | -6.80444E-05 | -4.82241E-02 | -1.01997E-02 |
| 10th Qcon Coefficient | 9.61559E-04 | -3.40691E-04 | -1.05142E-03 | 1.77035E-03 | 3.00756E-03 | 9.00401E-03 | 9.57890E-04 | -6.34049E-02 | -5.49216E-03 |
| 12th Qcon Coefficient | -1.38936E-04 | 2.22339E-05 | 2.07564E-04 | -4.54879E-04 | -1.06360E-03 | 5.98022E-03 | 5.08829E-03 | 9.53419E-03 | 5.47078E-04 |
| 14th Qcon Coefficient | -5.00362E-05 | 4.42490E-05 | 6.84128E-05 | 1.20468E-04 | 2.04460E-04 | 6.51753E-03 | -2.85530E-05 | 4.30838E-02 | 6.37807E-04 |
| 16th Qcon Coefficient | -3.56029E-06 | -2.24466E-05 | -1.21855E-05 | -1.21698E-04 | -9.82455E-05 | 2.97556E-03 | -7.37560E-06 | 4.05487E-02 | 2.70869E-04 |
| 18th Qcon Coefficient | -7.46337E-06 | 3.66857E-06 | 7.54999E-06 | 7.90223E-05 | 8.76028E-05 | 9.76386E-04 | -1.08752E-05 | 2.32526E-02 | -1.93336E-04 |
| 20th Qcon Coefficient | 4.50142E-06 | -5.00583E-08 | -1.15916E-06 | -1.54272E-05 | -3.07369E-05 | 9.70022E-05 | 3.13232E-06 | 6.40326E-03 | 3.67581E-04 |
| 22th Qcon Coefficient | | | | | | | | | |
| 24th Qcon Coefficient | | | | | | | | | |
| 26th Qcon Coefficient | | | | | | | | | |
| 28th Qcon Coefficient | | | | | | | | | |
| 30th Qcon Coefficient | | | | | | | | | |

FIG. 16B
TABLE 8 (Cont'd)

| Surface | 11 | 12 | 13 | 14 | 15 | 16 | 17 | 18 | 19 |
|---|---|---|---|---|---|---|---|---|---|
| Y Radius | 2.75578.E+02 | -1.08101.E+01 | -9.29195.E+00 | 8.96697.E+00 | 4.56405.E+01 | 3.28190.E+00 | 4.75401.E+00 | -3.31450.E+01 | 3.02768.E+00 |
| Normalization Radius | 2.26205.E+00 | 2.10458.E+00 | 2.24911.E+00 | 2.38350.E+00 | 3.32734.E+00 | 3.30516.E+00 | 3.71451.E+00 | 4.38759.E+00 | 4.93685.E+00 |
| K | 0.00000.E+00 | 6.07808.E-01 | 3.44279.E+00 | -9.89420.E+01 | 3.46665.E+00 | 0.00000.E+00 | 0.00000.E+00 | 6.86898.E+01 | -9.98832.E+00 |
| 4th Qcon Coefficient | -2.75358.E-01 | -5.03831.E-02 | -1.84515.E-02 | -3.53286.E-01 | -6.88451.E-01 | -4.09574.E+00 | -2.77351.E+00 | -1.17129.E+00 | -2.74293.E+00 |
| 6th Qcon Coefficient | 7.93428.E-02 | -1.16906.E-02 | 1.73720.E-02 | -1.14708.E-01 | 2.62754.E-01 | -6.52882.E-02 | 4.19220.E-01 | 1.09415.E+00 | 3.07544.E-01 |
| 8th Qcon Coefficient | -1.20289.E-02 | 4.47425.E-03 | 6.74041.E-03 | 4.71675.E-02 | 1.99929.E-01 | -1.09991.E-01 | -7.58251.E-02 | -5.68761.E-01 | -3.22921.E-01 |
| 10th Qcon Coefficient | 5.27776.E-04 | 1.05333.E-03 | 5.12153.E-03 | -5.77507.E-04 | -1.43578.E-02 | -6.98075.E-02 | -1.96181.E-02 | 2.39553.E-01 | 7.46240.E-02 |
| 12th Qcon Coefficient | 6.07248.E-03 | 1.95481.E-03 | 1.81228.E-03 | 7.59638.E-03 | 6.00338.E-02 | 5.15918.E-02 | -9.80210.E-03 | -8.18216.E-02 | -3.14535.E-02 |
| 14th Qcon Coefficient | 7.41324.E-04 | -1.80630.E-04 | -9.80150.E-04 | -1.30171.E-03 | -3.59511.E-02 | 5.45973.E-02 | 1.02952.E-02 | 3.42412.E-03 | 7.09994.E-03 |
| 16th Qcon Coefficient | 6.17910.E-04 | 8.71164.E-05 | 1.08905.E-04 | 3.86700.E-04 | -4.40201.E-02 | 2.38449.E-02 | -6.64263.E-04 | -2.23537.E-02 | 3.81175.E-02 |
| 18th Qcon Coefficient | -3.60050.E-04 | -6.64238.E-05 | -1.51573.E-04 | -3.94671.E-04 | -2.84187.E-02 | 3.98055.E-03 | -4.95735.E-03 | -3.54784.E-03 | 3.39913.E-02 |
| 20th Qcon Coefficient | 1.46114.E-04 | -6.61963.E-05 | -9.50389.E-06 | -3.58865.E-05 | -3.17998.E-03 | 5.20799.E-03 | -4.26512.E-04 | -2.17337.E-03 | 1.36729.E-04 |
| 22th Qcon Coefficient | - | - | - | - | - | 2.34553.E-03 | 2.21256.E-03 | -4.94243.E-03 | -1.08600.E-02 |
| 24th Qcon Coefficient | - | - | - | - | - | -8.97024.E-04 | -1.07302.E-03 | -5.33786.E-03 | -1.33549.E-02 |
| 26th Qcon Coefficient | - | - | - | - | - | 9.56483.E-05 | -5.69068.E-04 | -1.49099.E-03 | -6.60100.E-03 |
| 28th Qcon Coefficient | - | - | - | - | - | 7.98649.E-04 | -1.24127.E-03 | -4.99158.E-03 | -2.94054.E-03 |
| 30th Qcon Coefficient | - | - | - | - | - | 1.83246.E-04 | -7.15067.E-04 | -2.15873.E-04 | 1.73198.E-04 |

FIG. 17A

TABLE 10

| Surface | 2 | Stop | 4 | 5 | 6 | 7 | 8 | 9 | 10 |
|---|---|---|---|---|---|---|---|---|---|
| Y Radius | 3.00537.E+00 | 2.96855.E+00 | 2.56772.E+00 | 3.14457.E+01 | 3.92047.E+01 | 6.47272.E+00 | 9.41462.E+00 | 1.09923.E+01 | 4.10365.E+01 |
| Normalization Radius | 1.76418.E+00 | 1.69713.E+00 | 1.68191.E+00 | 1.56708.E+00 | 1.59050.E+00 | 1.84972.E+00 | 1.46333.E+00 | 2.43663.E+00 | 2.02041.E+00 |
| K | -3.04834.E+00 | -1.66243.E+00 | -4.04020.E-01 | -4.41045.E+01 | -9.63018.E+01 | 1.32580.E+01 | 0.00000.E+00 | 0.00000.E+00 | 0.00000.E+00 |
| 4th Qcon Coefficient | -1.39586.E-01 | -4.06760.E-01 | -2.07799.E-01 | -5.69994.E-02 | -5.75944.E-03 | -2.88171.E-02 | -1.91854.E-01 | -4.84175.E-01 | -8.28927.E-03 |
| 6th Qcon Coefficient | -2.82185.E-02 | 2.92730.E-02 | 4.91469.E-02 | 1.57101.E-02 | 1.56104.E-02 | -1.44386.E-02 | -6.51724.E-03 | 1.60244.E-01 | 2.39428.E-02 |
| 8th Qcon Coefficient | 1.02640.E-03 | -2.17768.E-03 | -1.22592.E-03 | -4.64728.E-03 | -5.47361.E-03 | -5.07864.E-03 | 1.58900.E-03 | -3.69329.E-02 | -6.56126.E-03 |
| 10th Qcon Coefficient | 1.00527.E-03 | -4.87346.E-04 | -1.24392.E-03 | 2.38839.E-03 | 3.02602.E-03 | 6.91871.E-03 | 7.07237.E-04 | -6.98602.E-02 | -3.91949.E-03 |
| 12th Qcon Coefficient | -1.09439.E-04 | 8.96644.E-05 | 1.95602.E-04 | -7.96540.E-04 | -1.21801.E-03 | 7.71692.E-03 | 1.36997.E-04 | 1.26868.E-02 | 2.15525.E-03 |
| 14th Qcon Coefficient | -5.68269.E-05 | 4.34472.E-05 | 7.64247.E-05 | 1.48069.E-04 | 1.82044.E-04 | 7.84436.E-03 | -4.47245.E-05 | 4.33844.E-02 | -1.20764.E-03 |
| 16th Qcon Coefficient | 6.60207.E-06 | -2.44841.E-05 | -2.52436.E-05 | -1.47797.E-04 | -1.13574.E-04 | 4.00758.E-03 | 1.19681.E-05 | 3.96864.E-02 | 8.99787.E-04 |
| 18th Qcon Coefficient | -8.56689.E-06 | 5.53689.E-06 | 6.74219.E-06 | 1.00023.E-06 | 1.20691.E-04 | 1.37918.E-03 | -8.90972.E-06 | 2.11317.E-02 | -6.56711.E-04 |
| 20th Qcon Coefficient | 4.50142.E-06 | -4.35267.E-07 | 1.22434.E-06 | -1.79203.E-05 | -3.29871.E-05 | 1.97737.E-04 | 1.76466.E-06 | 6.97189.E-03 | 2.65832.E-04 |
| 22th Qcon Coefficient | - | - | - | - | - | - | - | - | - |
| 24th Qcon Coefficient | - | - | - | - | - | - | - | - | - |
| 26th Qcon Coefficient | - | - | - | - | - | - | - | - | - |
| 28th Qcon Coefficient | - | - | - | - | - | - | - | - | - |
| 30th Qcon Coefficient | - | - | - | - | - | - | - | - | - |

FIG. 17B
TABLE 10 (Cont'd)

| Surface | 11 | 12 | 13 | 14 | 15 | 16 | 17 | 18 | 19 |
|---|---|---|---|---|---|---|---|---|---|
| Y Radius | 1.02651.E+01 | 7.98662.E+01 | -9.65911.E+00 | 2.37259.E+01 | -3.94875.E+01 | 3.13636.E+00 | 5.18790.E+00 | -3.27155.E+01 | 2.77497.E+00 |
| Normalization Radius | 2.26205.E+00 | 2.14597.E+00 | 2.25998.E+00 | 2.39350.E+00 | 3.32734.E+00 | 3.28325.E+00 | 3.71451.E+00 | 4.39759.E+00 | 4.93685.E+00 |
| K | 0.00000.E+00 | 1.44265.E+01 | 5.50259.E+00 | -9.89420.E+01 | 3.46665.E+00 | 0.00000.E+00 | 0.00000.E+00 | 6.60923.E+01 | -1.38474.E+01 |
| 4th Qcon Coefficient | -3.13115.E-01 | -4.49812.E-02 | -3.63333.E-02 | -3.58060.E-01 | -7.09510.E-01 | -4.44600.E+00 | -2.65083.E+00 | -1.24496.E+00 | -3.39395.E+00 |
| 6th Qcon Coefficient | 6.81921.E-02 | -1.61583.E-02 | 1.75735.E-02 | -1.19546.E-01 | 2.20365.E-01 | 1.24866.E-01 | 4.97265.E-01 | 1.19321.E+00 | 3.54865.E-01 |
| 8th Qcon Coefficient | -1.08442.E-02 | -2.87174.E-03 | 4.90717.E-03 | 4.51597.E-02 | 1.87410.E-01 | -7.46022.E-02 | -3.91427.E-02 | -5.85631.E-01 | -3.46334.E-01 |
| 10th Qcon Coefficient | 2.04277.E-03 | 2.16892.E-04 | 3.08989.E-03 | -2.45902.E-03 | 1.12421.E-02 | -1.09893.E-01 | -5.51679.E-02 | 2.57781.E-01 | 8.02169.E-02 |
| 12th Qcon Coefficient | 5.37650.E-03 | -3.19657.E-04 | 4.65764.E-04 | 7.57197.E-03 | 4.57807.E-02 | 2.98200.E-02 | -1.03080.E-02 | -1.03654.E-01 | -8.20768.E-03 |
| 14th Qcon Coefficient | -1.45154.E-03 | -3.01168.E-04 | -1.32272.E-03 | -1.15329.E-03 | -3.77056.E-02 | 5.71505.E-02 | -1.58329.E-03 | 1.25594.E-02 | 9.95816.E-02 |
| 16th Qcon Coefficient | 2.28174.E-04 | 3.47864.E-04 | 2.38109.E-04 | 4.80388.E-04 | -4.05876.E-02 | 3.66351.E-02 | 2.42852.E-03 | -2.78704.E-02 | 2.19020.E-02 |
| 18th Qcon Coefficient | -7.34551.E-04 | 2.98983.E-05 | 3.81317.E-05 | -2.38813.E-04 | -2.67837.E-02 | 6.46945.E-03 | -6.74230.E-03 | 4.34172.E-03 | 1.03316.E-02 |
| 20th Qcon Coefficient | 1.76614.E-04 | -1.30007.E-05 | 1.04630.E-05 | -6.10500.E-05 | -3.39225.E-03 | 3.56155.E-03 | 1.84273.E-03 | -4.00808.E-03 | -1.96096.E-02 |
| 22th Qcon Coefficient |  |  |  |  |  | 8.04800.E-04 | 1.84895.E-03 | 5.19983.E-04 | -7.11581.E-03 |
| 24th Qcon Coefficient |  |  |  |  |  | -3.33591.E-03 | -9.19968.E-03 | -3.54567.E-03 | -2.49300.E-03 |
| 26th Qcon Coefficient |  |  |  |  |  | -2.28066.E-03 | 1.78517.E-04 | -7.38706.E-04 | -2.94824.E-04 |
| 28th Qcon Coefficient |  |  |  |  |  | -2.67765.E-04 | -4.43429.E-04 | -3.04820.E-03 | -1.28649.E-03 |
| 30th Qcon Coefficient |  |  |  |  |  | -4.00129.E-06 | -2.79739.E-04 | -1.70783.E-03 | -5.25453.E-04 |

SMALL WIDE-ANGLE LENS SYSTEM

CROSS REFERENCE TO RELATED APPLICATION

The present application claims priority to Korean Patent Application No. 10-2021-0073388, filed Jun. 7, 2021 the entire contents of which is incorporated herein for all purposes by this reference.

BACKGROUND OF THE INVENTION

Field of the Invention

The present invention relates to a wide-angle lens system including a total of nine lenses, and more particularly to a small wide-angle lens system configured such that the lens system is small and lightweight by appropriately designing the refractive powers, shapes, etc. of the lenses and such that high-resolution images can be provided by correcting distortion, whereby it is possible to obtain wide-angle images.

Description of the Related Art

Recent mobile terminals are equipped with a camera, with which it is possible to perform video communication and to take photographs. In addition, as the number of functions of the camera in the mobile terminal gradually increases, demand for high resolution and wide angle of a camera for mobile terminals has gradually increased, and there is a trend toward miniaturization of the camera such that the mobile terminal can be easily and conveniently carried.

In recent years, a lens of the camera has been made of a plastic material, which is lighter than glass, in order to realize high quality, high performance, and miniaturization of the camera, and the number of lenses is universally increased in order to realize high resolution.

For recent smartphones, it is advantageous to miniaturize a camera by reducing the size of a camera opening due to expansion of a display. To this end, it is important to reduce an effective diameter of a first lens.

Particular, for a small lens mounted in a smartphone, it is advantageous to reduce the length of the lens system (total track length) as much as possible due to limitation in the thickness of the smartphone.

FIG. 1 shows a lens system disclosed in U.S. Pat. No. 9,835,822. In the lens system shown in FIG. 1, a ratio of the distance from a front surface of a lens to the image surface (TTL) to the height of an image surface (ImagH), TTL/ImagH, which is related to the length of the lens, is 1.65, which is long, even though a total of eight lenses are used, and therefore it is difficult to implement a small lens system.

In addition, Fno of the lens system is 1.9. That is, the diameter of a stop is small, whereby an image is dark, and therefore there is a limitation in application to a high-quality, high-performance smartphone.

SUMMARY OF THE INVENTION

The present invention has been made in view of the above problems, and it is an object of the present invention to provide a small wide-angle lens system including a total of nine lenses and configured such that the lens system is small and lightweight by appropriately designing the refractive powers, shapes, etc. of the lenses and such that high-resolution images can be provided by correcting distortion.

In accordance with an aspect of the present invention, the above and other objects can be accomplished by the provision of a small wide-angle lens system including a first lens, a second lens, a third lens, a fourth lens, a fifth lens, a sixth lens, a seventh lens, an eighth lens, and a ninth lens sequentially arranged from an object, wherein the first lens has a convex object-side surface, the third lens has a negative refractive power, the fourth lens has a concave image-side surface, the sixth lens has a concave object-side surface and a concave image-side surface, the ninth lens has a negative refractive power and a concave object-side surface, all surfaces of the first to ninth lenses are aspherical surfaces, the refractive power P1 of the first lens satisfies |P1|<0.01, and Fno of the lens system satisfies Fno<1.6.

On the assumption that the angle of incidence of light incident on the edge of an effective diameter of an image-side surface of the ninth lens is A92, A92 may satisfy A92<12°.

In accordance with another aspect of the present invention, there is provided a small wide-angle lens system including a first lens, a second lens, a third lens, a fourth lens, a fifth lens, a sixth lens, a seventh lens, an eighth lens, and a ninth lens sequentially arranged from an object, wherein a stop is located between the first lens and the second lens, the first lens has a convex object-side surface, the third lens has a negative refractive power and a concave image-side surface, the fifth lens has a negative refractive power, a concave object-side surface, and a convex image-side surface, the sixth lens has a concave object-side surface and a concave image-side surface, the ninth lens has a negative refractive power and a concave object-side surface, all surfaces of the first to ninth lenses are aspherical surfaces, the refractive power P1 of the first lens satisfies |P1|<0.01, and, on the assumption that an angle of incidence of light incident on an edge of an effective diameter of an image-side surface of the ninth lens is A92, A92 satisfies A92<12°.

Fno of the lens system may satisfy Fno<1.6.

The minimum value CTm of a central thickness of the lens system may satisfy CTm≤0.4.

A ratio of a central thickness CT9 of the ninth lens to an edge thickness ET9 of an effective diameter of the ninth lens may satisfy 0.15<CT9/ET9<1.0.

The half field of view HFOV of the lens system may satisfy 38°<HFOV<50°.

The focal distance f4 of the fourth lens, the focal distance f5 of the fifth lens, the focal distance f6 of the sixth lens, and the focal distance f7 of the seventh lens may satisfy (|f5|+|f6|)/(|f4|+|f7|)<7.

At least one inflection point may be provided at the object-side surface and an image-side surface of the first lens.

The number NVd40 of lenses having a variance constant of 40 or more may satisfy NVd40≥3.

The radius of curvature R3 of an object-side surface of the second lens, the radius of curvature R4 of an image-side surface of the second lens, the radius of curvature R5 of an object-side surface of the third lens, and the radius of curvature R6 of the image-side surface of the third lens may satisfy 0.5<|(R3+R4)|/|(R5+R6)|<2.0.

A ratio of the distance TL from the center of the object-side surface of the first lens to an image surface to an image surface height ImagH may satisfy TL/ImagH<1.7.

BRIEF DESCRIPTION OF THE DRAWINGS

The above and other objects, features and other advantages of the present invention will be more clearly understood from the following detailed description taken in conjunction with the accompanying drawings, in which:

FIGS. 13A and 13B (sometimes referred to herein as simply FIG. 13) show Table 2 which lists the Qcon coefficients obtained from Mathematical Expression 1;

FIGS. 14A and 14B (sometimes referred to herein as simply FIG. 14) show Table 4 which lists the Qcon coefficients obtained from Mathematical Expression 1;

FIGS. 15A and 15B (sometimes referred to herein as simply FIG. 15) show Table 6 which lists the Qcon coefficients obtained from Mathematical Expression 1;

FIGS. 16A and 16B (sometimes referred to herein as simply FIG. 16) show Table 8 which lists the Qcon coefficients obtained from Mathematical Expression 1; and FIGS. 17A and 17B (sometimes referred to herein as simply FIG. 17) show Table 10 which lists the Qcon coefficients obtained from Mathematical Expression 1.

DETAILED DESCRIPTION OF THE INVENTION

The present invention relates to a wide-angle lens system including a total of nine lenses, and more particularly to a lens system configured such that a first lens, a second lens, a third lens, a fourth lens, a fifth lens, a sixth lens, a seventh lens, an eighth lens, and a ninth lens are sequentially arranged from an object along an optical axis.

In addition, the present invention relates to a high-resolution small wide-angle lens system configured such that distortion of the small wide-angle lens system is corrected while the small wide-angle lens system is small and lightweight by appropriately designing the refractive powers, shapes, etc. of lenses and such that TTL is short even though the small wide-angle lens system has a large field of view, whereby the high-resolution small wide-angle lens system is easily applicable to a thin or small camera module, particularly a smartphone.

Also, in the present invention, TTL is short even though the nine lenses are used, whereby it is possible to provide a small, thin camera module, and the refractive power P1 of the first lens satisfies |P1|<0.01, whereby an effective diameter of the first lens may be reduced, and therefore a camera opening may be reduced. Consequently, it is possible to provide a small lens system.

Figure 1:
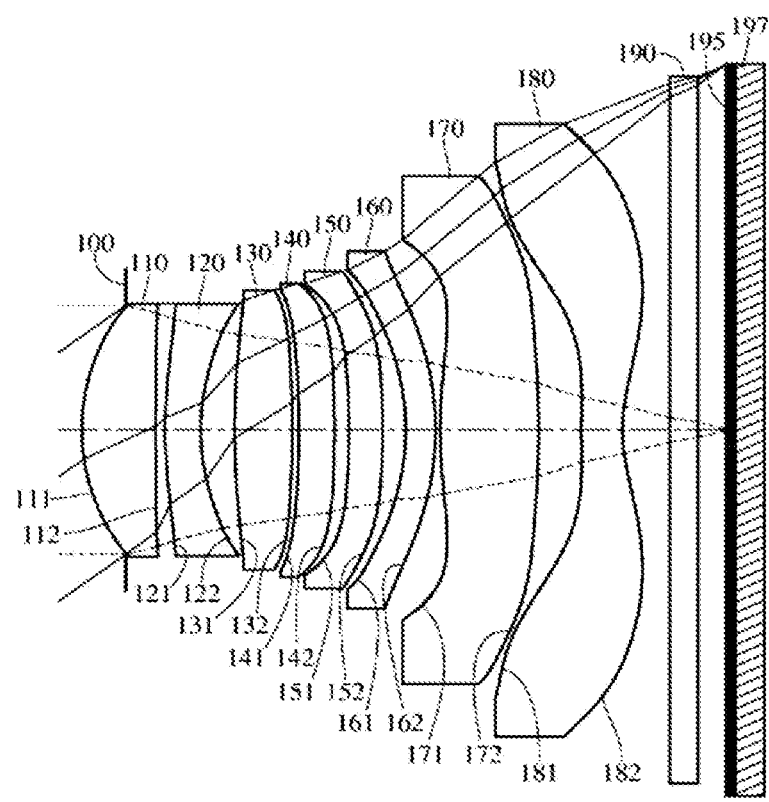
FIG. 1 is a schematic view showing a conventional small wide-angle lens system.
Figure 2:
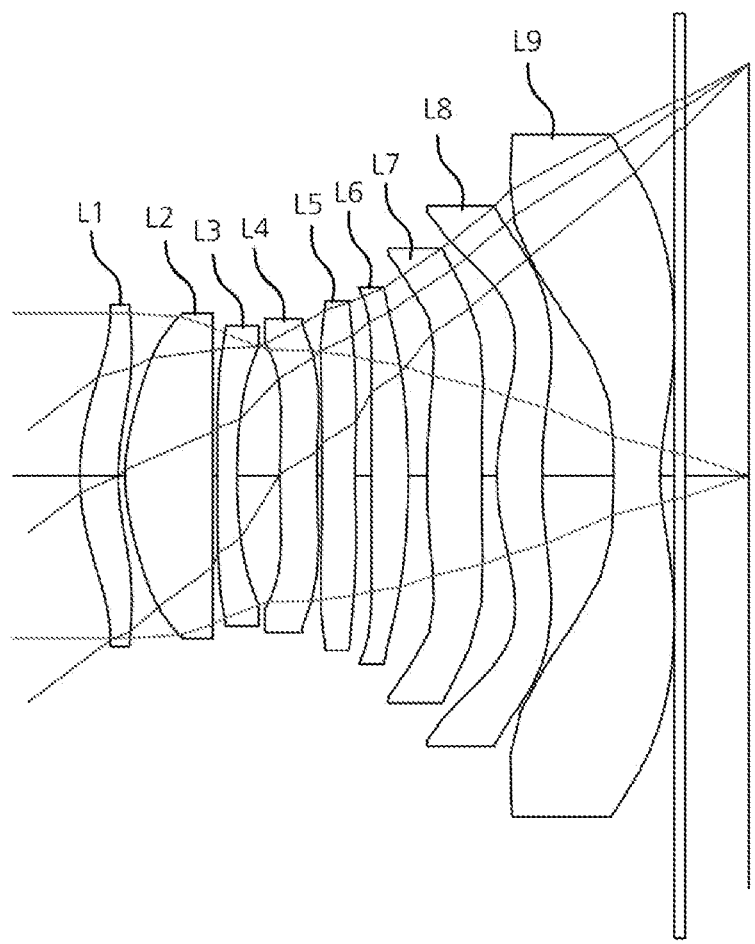
FIG. 2 is a view showing a first embodiment of a small wide-angle lens system according to the present invention.
Figure 3:
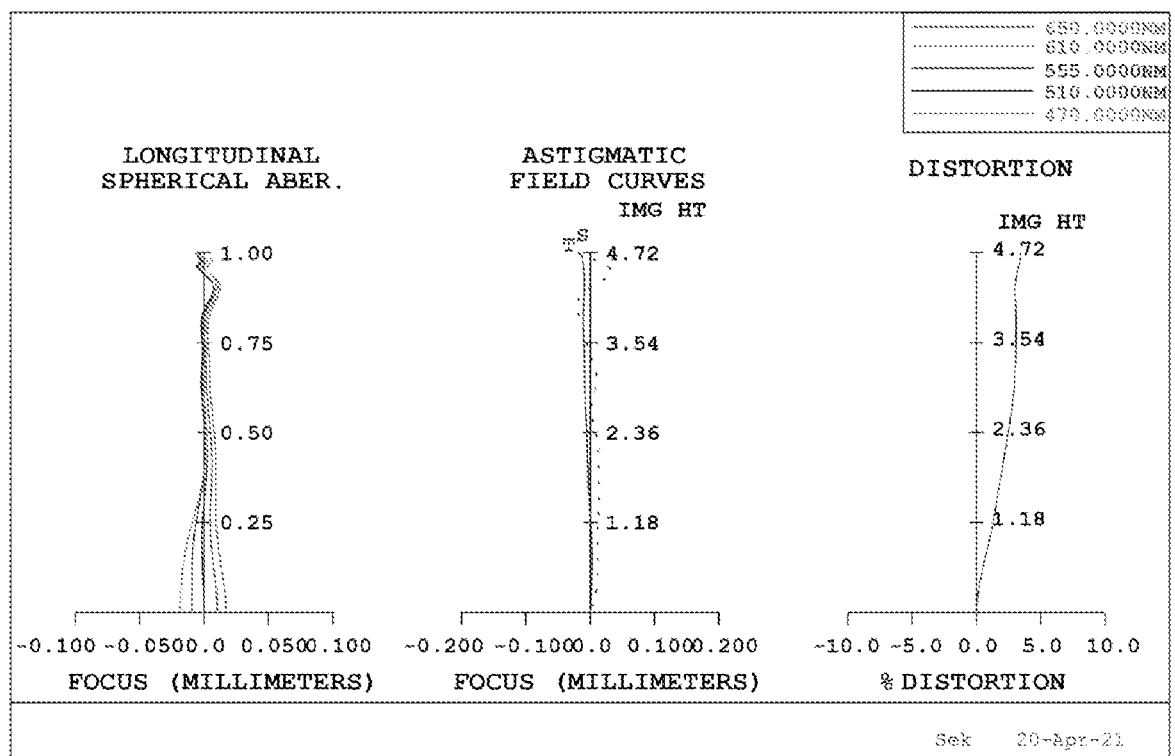
FIG. 3 is a view showing aberration according to a first embodiment of the present invention.
Figure 4:
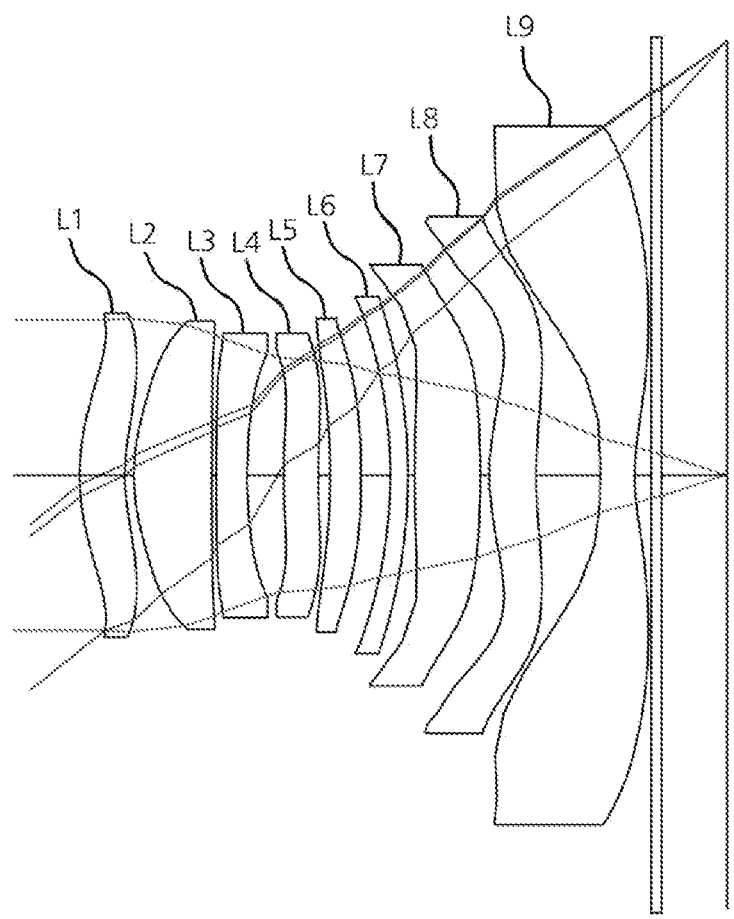
FIG. 4 is a view showing a second embodiment of the small wide-angle lens system according to the present invention.
Figure 5:
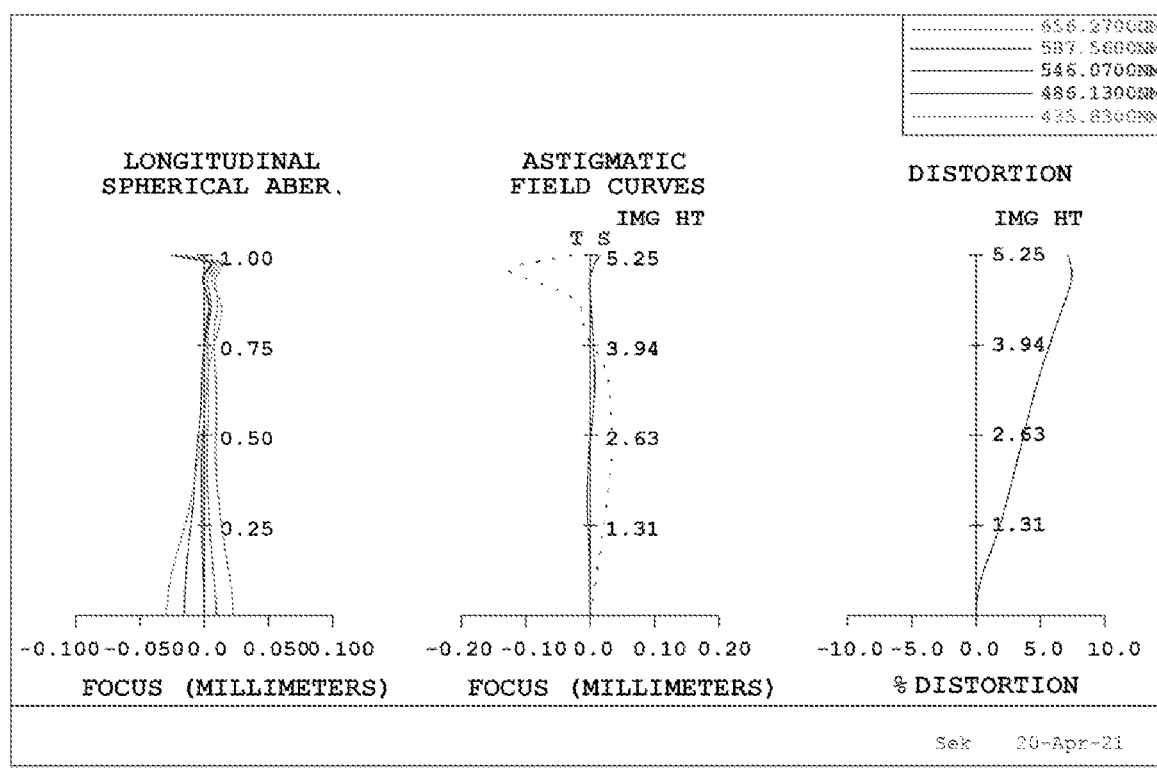
FIG. 5 is a view showing aberration according to a second embodiment of the present invention.
Figure 6:
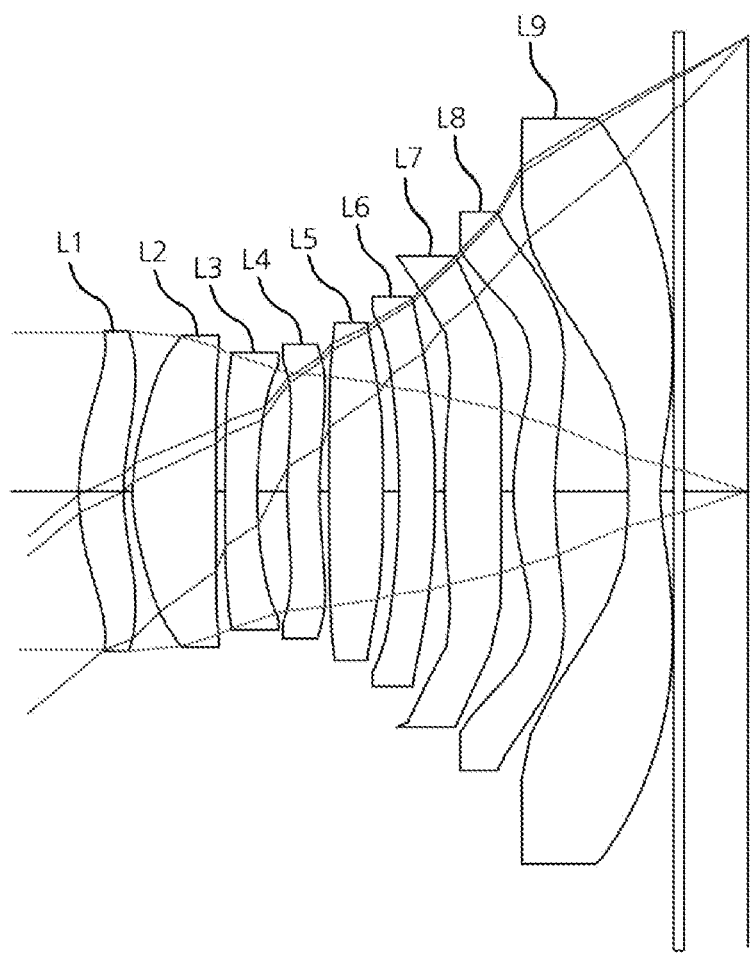
FIG. 6 is a view showing a third embodiment of the small wide-angle lens system according to the present invention.
Figure 7:
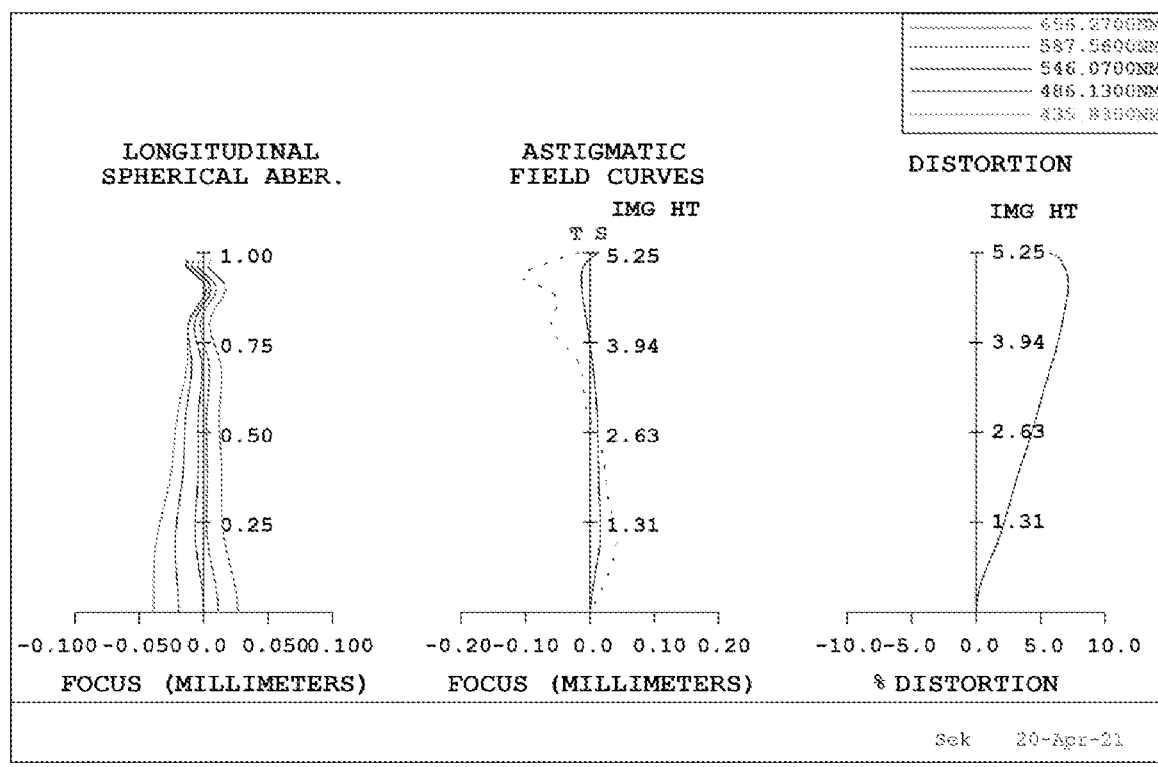
FIG. 7 is a view showing aberration according to a third embodiment of the present invention.
Figure 8:
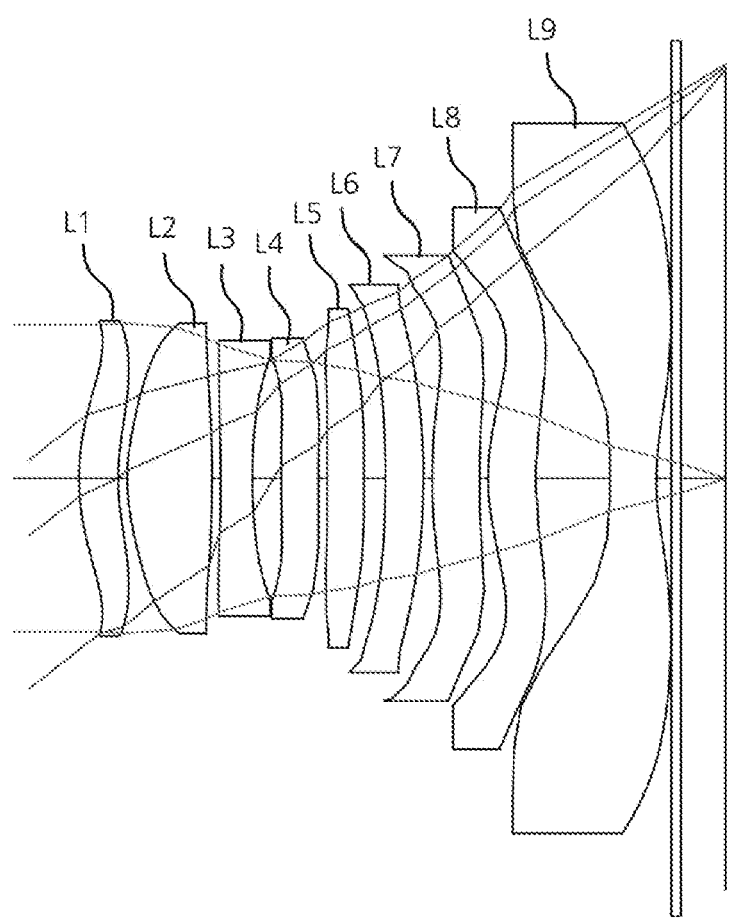
FIG. 8 is a view showing a fourth embodiment of the small wide-angle lens system according to the present invention.
Figure 9:
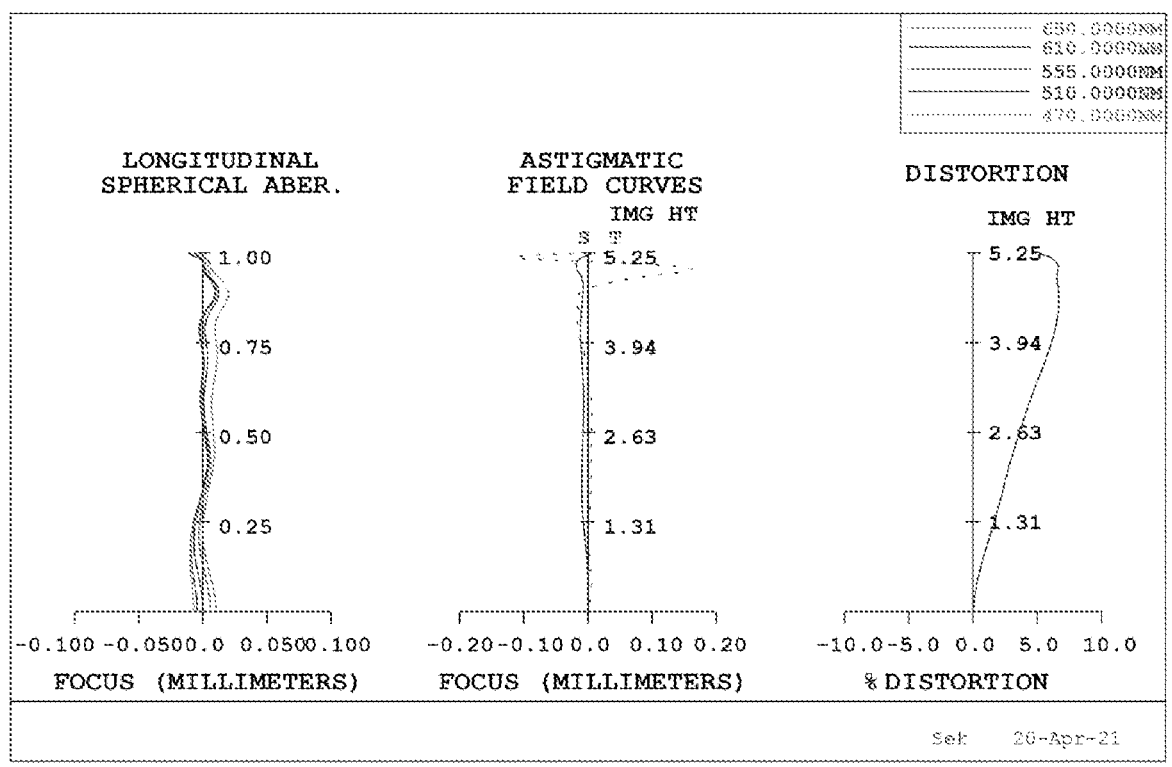
FIG. 9 is a view showing aberration according to a fourth embodiment of the present invention.
Figure 10:
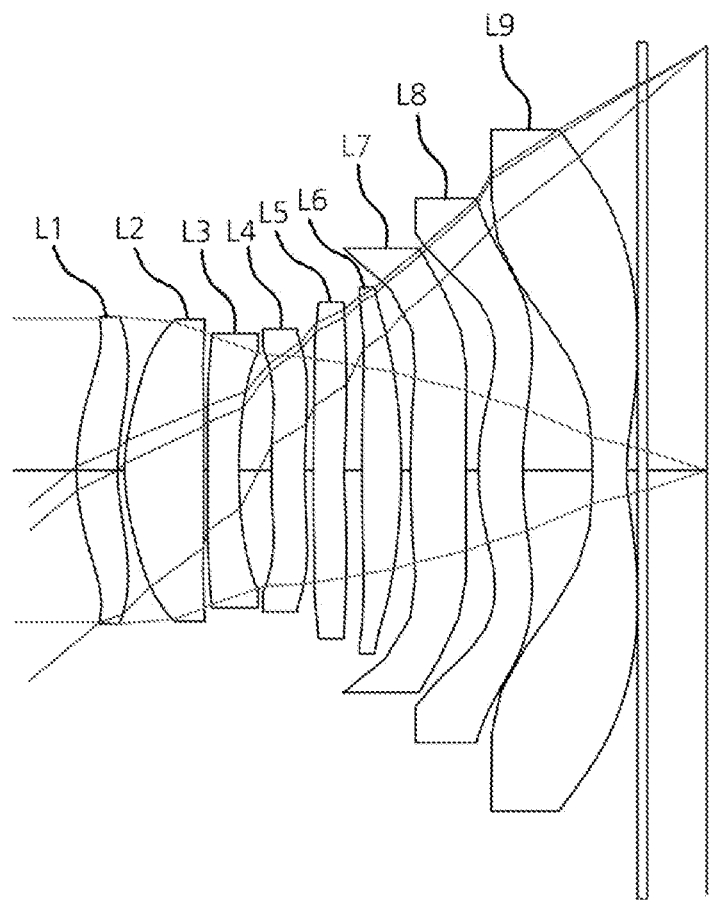
FIG. 10 is a view showing a fifth embodiment of the small wide-angle lens system according to the present invention.
Figure 11:
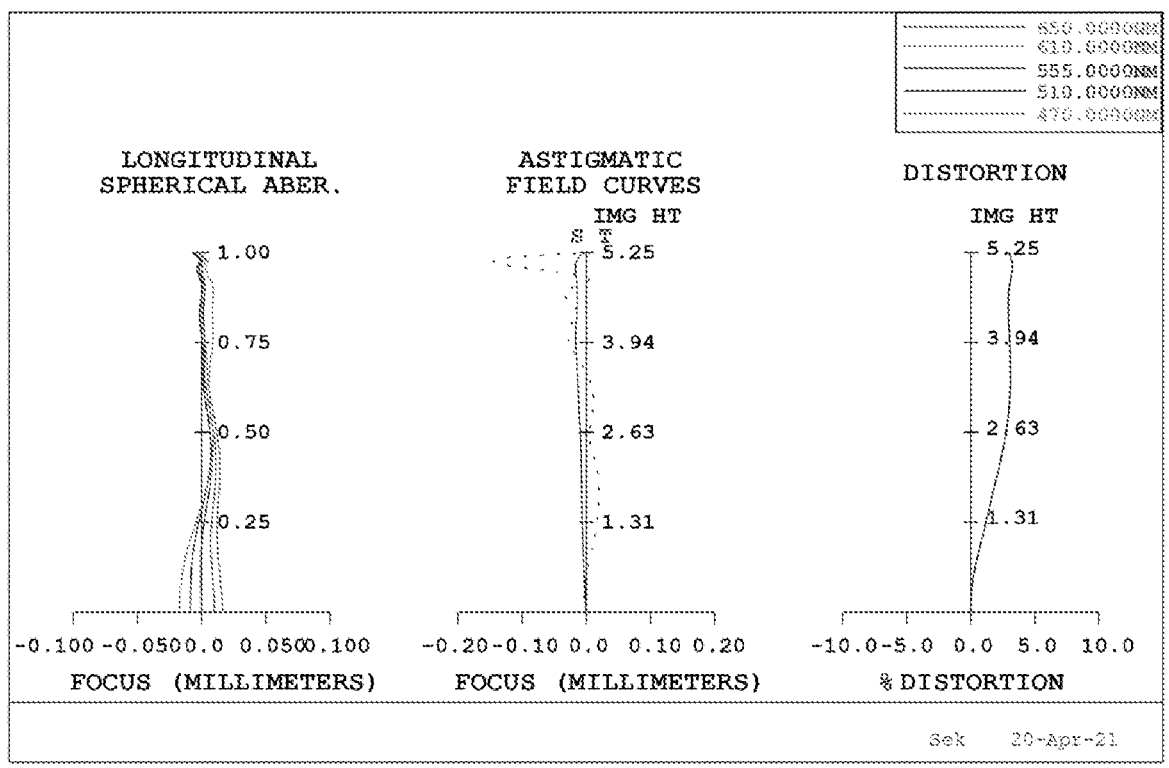
FIG. 11 is a view showing aberration according to a fifth embodiment of the present invention.
Figure 12:
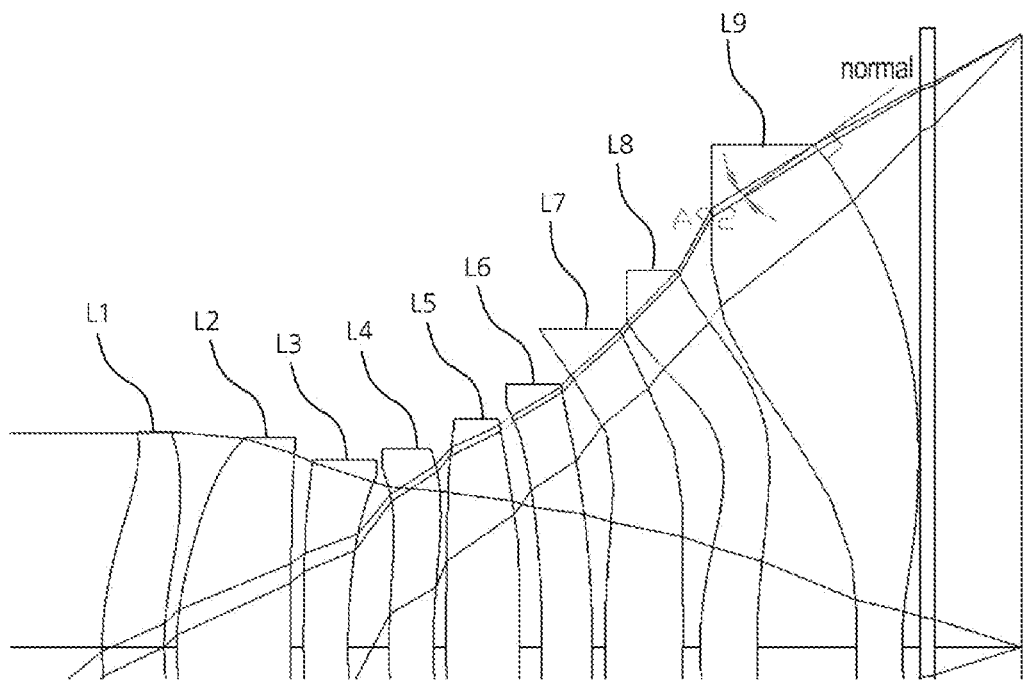
FIG. 12 is a schematic view defining an angle of incidence A92 of light incident on the edge of an effective diameter of an image-side surface of a ninth lens according to an embodiment of the present invention.

Hereinafter, the present invention will be described in detail with reference to the accompanying drawings. FIG. 2 is a view showing a first embodiment of a small wide-angle lens system according to the present invention, FIG. 3 is a view showing aberration according to a first embodiment of the present invention, FIG. 4 is a view showing a second embodiment of the small wide-angle lens system according to the present invention, FIG. 5 is a view showing aberration according to a second embodiment of the present invention, FIG. 6 is a view showing a third embodiment of the small wide-angle lens system according to the present invention, FIG. 7 is a view showing aberration according to a third embodiment of the present invention, FIG. 8 is a view showing a fourth embodiment of the small wide-angle lens system according to the present invention, FIG. 9 is a view showing aberration according to a fourth embodiment of the present invention, FIG. 10 is a view showing a fifth embodiment of the small wide-angle lens system according to the present invention, FIG. 11 is a view showing aberration according to a fifth embodiment of the present invention, and FIG. 12 is a schematic view defining an angle of incidence A92 of light incident on the edge of an effective diameter of an image-side surface of a ninth lens according to an embodiment of the present invention.

As shown, an embodiment of the present invention provides a small wide-angle lens system including a first lens, a second lens, a third lens, a fourth lens, a fifth lens, a sixth lens, a seventh lens, an eighth lens, and a ninth lens sequentially arranged from an object, wherein an object-side surface of the first lens is convex, the third lens has a negative refractive power, an image-side surface of the fourth lens is concave, an object-side surface of the sixth lens is concave, an image-side surface of the sixth lens is concave, the ninth lens has a negative refractive power, an object-side surface of the ninth lens is concave, all surfaces of the first to ninth lenses are aspherical surfaces, the refractive power P1 of the first lens satisfies |P1|<0.01, and Fno of the lens system satisfies Fno<1.6.

In addition, another embodiment of the present invention provides a small wide-angle lens system including a first lens, a second lens, a third lens, a fourth lens, a fifth lens, a sixth lens, a seventh lens, an eighth lens, and a ninth lens sequentially arranged from an object, wherein a stop is located between the first lens and the second lens, an object-side surface of the first lens is convex, the third lens has a negative refractive power, an image-side surface of the third lens is concave, the fifth lens has a negative refractive power, an object-side surface of the fifth lens is concave, an image-side surface of the fifth lens is convex, an object-side surface of the sixth lens is concave, an image-side surface of the sixth lens is concave, the ninth lens has a negative refractive power, an object-side surface of the ninth lens is concave, all surfaces of the first to ninth lenses are aspherical surfaces, the refractive power P1 of the first lens satisfies |P1|<0.01, and, on the assumption that the angle of incidence of light incident on the edge of an effective diameter of an image-side surface of the ninth lens is A92, A92 satisfies A92<12°.

The lenses constituting the lens system according to the present invention, which are suitable for application to a small high-resolution lens system, have uniformly distributed positive and negative refractive powers, are constituted by aspherical surfaces, and are configured to be convex or concave.

In particular, the refractive power P1 of the first lens satisfies |P1|<0.01, whereby an effective diameter of the first lens may be reduced, and therefore a camera opening may be reduced. Consequently, it is possible to provide a small lens system.

In addition, the refractive power P1 of the first lens satisfies |P1|<0.01, whereby the first lens may have very low refractive power, and therefore tolerance sensitivity may be alleviated. Consequently, it is possible to provide a small lens system having excellent performance reproducibility.

In addition, breakage in shape of the first lens is prevented when the first lens is processed, and the flow of a resin is smoothly maintained at the time of injection, whereby manufacturing tolerance is alleviated, and therefore performance reproducibility is further improved, which is advantageous in application to a small lens system.

In addition, Fno of the lens system according to the present invention satisfies Fno<1.6, whereby Fno is reduced, and therefore a clear image is obtainable even with a small amount of light. The diameter of the stop may be increased, whereby a bright image may be realized even in the dark, and therefore it is possible to provide a high-resolution, high-quality small lens system.

In addition, the angle of incidence A92 of light incident on the edge of the effective diameter of the image-side surface of the ninth lens is set to be smaller than 12°, whereby total internal reflection (lens flare) may be improved, and therefore it is possible to provide a high-resolution, high-quality small wide-angle lens system.

In addition, the minimum value CTm of the central thickness of the lens system according to the embodiment of the present invention satisfies CTm≤0.4, whereby the lens thickness is minimized, which is advantageous to a small, lightweight lens system.

In addition, a ratio of the central thickness CT9 of the ninth lens according to the present invention to the edge thickness ET9 of the effective diameter of the ninth lens satisfies 0.15<CT9/ET9<1.0, whereby the edge thickness of the ninth lens is set to be large, and therefore it is possible to correct distortion, which is advantageous in application to a high-resolution, high-performance lens system.

In addition, the half field of view HFOV of the lens system according to the present invention satisfies 38°<HFOV<50°, whereby it is possible to provide a wide-angle lens system, and therefore utilization thereof is high. Also, in the lens system according to the present invention, TTL is short even though the lens system has a large field of view, whereby it is possible to provide a high-resolution small wide-angle lens system that is easily applicable to a thin or small camera module, particularly a smartphone.

Also, in the present invention, the focal distance f4 of the fourth lens, the focal distance f5 of the fifth lens, the focal distance f6 of the sixth lens, and the focal distance f7 of the seventh lens satisfy (|f5|+|f6|)/(|f4|+|f7|)<7, whereby refractive powers are distributed to the respective lenses. When the nine lenses are assembled, therefore, tolerance sensitivity may be alleviated, whereby it is possible to provide a high-resolution, high-quality small lens system having excellent performance reproducibility. In addition, it is possible to correct aberration and to provide a miniaturized wide-angle lens system.

In addition, at least one inflection point is provided at the object-side surface and the image-side surface of the first lens according to the present invention, whereby it is possible to correct aberration, which is advantageous in application to a small lens system.

Also, in the lens system according to the present invention, the number NVd40 of lenses having a variance constant of 40 or more satisfies NVd40≥3, whereby it is possible to correct chromatic aberration, which is advantageous in application to a high-resolution, high-performance small lens system.

In addition, each of the first to ninth lenses L1 to L9 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having different Abbe numbers so as to be advantageous in correcting chromatic aberration.

Also, in the present invention, the radius of curvature R3 of an object-side surface of the second lens, the radius of curvature R4 of an image-side surface of the second lens, the radius of curvature R5 of an object-side surface of the third lens, and the radius of curvature R6 of an image-side surface of the third lens satisfy 0.5<|(R3+R4)|/|(R5+R6)|<2.0, whereby it is possible to correct the shape of the first lens and to similarly correct the shapes of the second lens and the third lens, which is advantageous in application to a small lens system.

In addition, a ratio of the distance TL from the center of the object-side surface of the first lens to an image surface to an image surface height ImagH satisfies TL/ImagH<1.7, whereby it is possible to provide a high-resolution small wide-angle lens system configured such that distortion of the small wide-angle lens system is corrected while the small wide-angle lens system is small and lightweight even though the nine lenses are used and such that TTL is short even though the small wide-angle lens system has a large field of view, whereby the high-resolution small wide-angle lens system is easily applicable to a thin or small camera module, particularly a smartphone.

As described above, the present invention relates to a lens system including a total of nine lenses, more particularly to a lens system configured such that a first lens L1, a second lens L2, a third lens L3, a fourth lens L4, a fifth lens L5, a sixth lens L6, a seventh lens L7, an eighth lens L8, and a ninth lens L9 are sequentially arranged from an object along an optical axis.

In particular, the present invention provides a small wide-angle lens system configured such that distortion of the small wide-angle lens system is corrected while the small wide-angle lens system is small and lightweight by appropriately designing the refractive powers, shapes, etc. of lenses and such that TTL is short even though the nine lenses are used, whereby the high-resolution small wide-angle lens system is easily applicable to a thin or small camera module, particularly a smartphone.

Hereinafter, embodiments of the present invention will be described with reference to the accompanying drawings.

First Embodiment

FIG. 2 is a view showing a first embodiment of a small high-resolution wide-angle lens system according to the present invention.

As shown, a first lens L1, a second lens L2, a third lens L3, a fourth lens L4, a fifth lens L5, a sixth lens L6, a seventh lens L7, an eighth lens L8, and a ninth lens L9 are sequentially arranged from an object on the optical axis. A stop is located between the first lens L1 and the second lens L2.

Table 1 below shows numerical data of the lenses constituting the lens system according to the first embodiment of the present invention.

TABLE 1

| Surface Number | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 2.1455 |
| 2 | Qcon Asphere | 2.9482 | 0.4116 | 544100.5600 | 1.8795 |
| Stop | Qcon Asphere | 2.8029 | 0.0752 | | 1.8619 |
| 4 | Qcon Asphere | 2.4239 | 0.9412 | 544100.5600 | 1.8295 |
| 5 | Qcon Asphere | 21.4309 | 0.0500 | | 1.7042 |
| 6 | Qcon Asphere | 25.2208 | 0.2100 | 670000.1940 | 1.6330 |
| 7 | Qcon Asphere | 6.2228 | 0.4644 | | 1.4805 |
| 8 | Qcon Asphere | 13.5534 | 0.4012 | 615000.2590 | 1.5186 |
| 9 | Qcon Asphere | 15.9215 | 0.0500 | | 1.7365 |
| 10 | Qcon Asphere | −1614.2211 | 0.3573 | 535000.5600 | 1.8981 |
| 11 | Qcon Asphere | 16.1007 | 0.1761 | | 1.9866 |
| 12 | Qcon Asphere | 200.0000 | 0.3951 | 544100.5600 | 2.0570 |
| 13 | Qcon Asphere | −10.8242 | 0.2070 | | 2.1590 |
| 14 | Qcon Asphere | 16.3115 | 0.5866 | 544100.5600 | 2.5500 |
| 15 | Qcon Asphere | −66.7083 | 0.1641 | | 2.6069 |
| 16 | Qcon Asphere | 3.1424 | 0.4825 | 544100.5600 | 2.6862 |
| 17 | Qcon Asphere | 5.6097 | 0.7739 | | 3.0856 |
| 18 | Qcon Asphere | −33.8484 | 0.5000 | 535000.5600 | 3.2728 |
| 19 | Qcon Asphere | 2.7148 | 0.1538 | | 3.9037 |
| 20 | Sphere | Infinity | 0.1100 | BK7_SCHOTT | 4.2914 |
| 21 | Sphere | Infinity | 0.6900 | | 4.3294 |
| Image | Sphere | Infinity | 0.0000 | | 4.7250 |

As shown in FIG. 2, the first lens L1, the second lens L2, the third lens L3, the fourth lens L4, the fifth lens L5, the sixth lens L6, the seventh lens L7, the eighth lens L8, and the ninth lens L9 are sequentially arranged from the object, and the Qcon polynomial of each lens based on Qcon asphere thereof is represented by Mathematical Expression 1 below.

$$z = \frac{cr^2}{1 + \sqrt{1 - (1+k)c^2 r^2}} + u^4 \sum_{m=0}^{13} a_m Q_m^{con}(u^2)$$ [Mathematical Expression 1]

Here, z indicates sag of a surface parallel to a z axis in the lens system, c indicates the vertex curvature of the lens at the vertex thereof, k indicates a conic constant, r indicates radial distance of the lens from the axis thereof, $r_n$ indicates a normalization radius, u indicates $r/r_n$, $a_m$ indicates an m-th Qcon coefficient, and $Q_m^{con}$ indicates a m-th Qcon polynomial.

Qcon coefficients are obtained from Mathematical Expression 1 above as shown in Table 2 in FIG. 13.

According to the first embodiment of the present invention, the refractive power P1 of the first lens is |P1|=0.46E-10, the number NVd40 of lenses having a variance constant of 40 or more is NVd40=7, a ratio of the distance TL from the center of the object-side surface of the first lens to the image surface to the image surface height ImagH is TL/ImagH=1.52, and the half field of view HFOV of the lens system is FOV=39.0°.

The radius of curvature R3 of the object-side surface of the second lens, the radius of curvature R4 of the image-side surface of the second lens, the radius of curvature R5 of the object-side surface of the third lens, and the radius of curvature R6 of the image-side surface of the third lens satisfy |(R3+R4)|/|(R5+R6)|=0.76, the minimum value CTm of the central thickness of the lens system satisfies CTm=0.21, and a ratio of the central thickness CT9 of the ninth lens to the edge thickness ET9 of the effective diameter of the ninth lens satisfies CT9/ET9=0.46.

In addition, the angle of incidence A92 of light incident on the edge of the effective diameter of the image-side surface of the ninth lens satisfies A92=0.6°, the focal distance f4 of the fourth lens, the focal distance f5 of the fifth lens, the focal distance f6 of the sixth lens, and the focal distance f7 of the seventh lens satisfy (|f5|+|f6|)/(|f4|+|f7|)=0.3, and Fno of the lens system satisfies Fno=1.51.

FIG. 3 is a view showing aberration according to a first embodiment of the present invention.

First data of FIG. 3 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 3 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 4 is a view showing a second embodiment of the high-resolution wide-angle lens system according to the present invention.

As shown, a first lens L1, a second lens L2, a third lens L3, a fourth lens L4, a fifth lens L5, a sixth lens L6, a seventh lens L7, an eighth lens L8, and a ninth lens L9 are sequentially arranged from an object on the optical axis.

Table 3 below shows numerical data of the lenses constituting the optical system according to the second embodiment of the present invention.

TABLE 3

| Surface Number | Surface Type | Y Radius | Thickness | Glass Code | Y Semi-Aperture |
|---|---|---|---|---|---|
| Object | Sphere | Infinity | Infinity | | |
| 1 | Sphere | Infinity | 0 | | 2.1243 |
| 2 | Qcon Asphere | 3.0058 | 0.5138 | 544100.5600 | 1.8795 |
| Stop | Qcon Asphere | 2.8242 | 0.1000 | | 1.8966 |
| 4 | Qcon Asphere | 2.4604 | 0.8861 | 544100.5600 | 1.8357 |
| 5 | Qcon Asphere | 24.8408 | 0.0507 | | 1.7150 |
| 6 | Qcon Asphere | 27.8491 | 0.3500 | 670000.1940 | 1.6645 |
| 7 | Qcon Asphere | 6.4250 | 0.4144 | | 1.4805 |
| 8 | Qcon Asphere | 8.0569 | 0.3941 | 615000.2590 | 1.5200 |
| 9 | Qcon Asphere | 12.2253 | 0.1329 | | 1.7142 |
| 10 | Qcon Asphere | −8.8949 | 0.3500 | 535000.5600 | 1.7885 |
| 11 | Qcon Asphere | −10.0689 | 0.3348 | | 1.8814 |
| 12 | Qcon Asphere | −6.1939 | 0.2000 | 615000.2590 | 2.0314 |
| 13 | Qcon Asphere | −7.1999 | 0.0741 | | 2.1350 |
| 14 | Qcon Asphere | 97.5811 | 0.7479 | 544100.5600 | 2.2083 |
| 15 | Qcon Asphere | −8.8419 | 0.1015 | | 2.4902 |
| 16 | Qcon Asphere | 3.1535 | 0.5299 | 544100.5600 | 2.7432 |
| 17 | Qcon Asphere | 5.4664 | 0.7278 | | 3.1232 |
| 18 | Qcon Asphere | −34.7066 | 0.3919 | 535000.5600 | 3.4300 |
| 19 | Qcon Asphere | 2.8667 | 0.1912 | | 4.2300 |
| 20 | Sphere | Infinity | 0.1100 | BK7_SCHOTT | 4.6437 |
| 21 | Sphere | Infinity | 0.7442 | | 4.6910 |
| Image | Sphere | Infinity | 0.0000 | | 5.2500 |

As shown in FIG. 4, the first lens L1, the second lens L2, the third lens L3, the fourth lens L4, the fifth lens L5, the sixth lens L6, the seventh lens L7, the eighth lens L8, and the ninth lens L9 are sequentially arranged from the object, and the Qcon polynomial of each lens based on Qcon asphere thereof is represented by Mathematical Expression 1 above.

Qcon coefficients are obtained from Mathematical Expression 1 above as shown in Table 4 in FIG. 14.

According to the second embodiment of the present invention, the refractive power P1 of the first lens is $|P1|=0.26E-70$, the number NVd40 of lenses having a variance constant of 40 or more is NVd40=6, a ratio of the distance TL from the center of the object-side surface of the first lens to the image surface to the image surface height ImagH is TL/ImagH=1.40, and the half field of view HFOV of the lens system is FOV=40.6°.

The radius of curvature R3 of the object-side surface of the second lens, the radius of curvature R4 of the image-side surface of the second lens, the radius of curvature R5 of the object-side surface of the third lens, and the radius of curvature R6 of the image-side surface of the third lens satisfy $|(R3+R4)|/|(R5+R6)|=0.80$, the minimum value CTm of the central thickness of the lens system satisfies CTm=0.20, and a ratio of the central thickness CT9 of the ninth lens to the edge thickness ET9 of the effective diameter of the ninth lens satisfies CT9/ET9=0.32.

In addition, the angle of incidence A92 of light incident on the edge of the effective diameter of the image-side surface of the ninth lens satisfies A92=2.3°, the focal distance f4 of the fourth lens, the focal distance f5 of the fifth lens, the focal distance f6 of the sixth lens, and the focal distance f7 of the seventh lens satisfy $(|f5|+|f6|)/(|f4|+|f7|)=4.54$, and Fno of the lens system satisfies Fno=1.52.

FIG. 5 is a view showing aberration according to a second embodiment of the present invention.

First data of FIG. 5 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 5 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the high-resolution wide-angle lens system according to the present invention.

As shown, a first lens L1, a second lens L2, a third lens L3, a fourth lens L4, a fifth lens L5, a sixth lens L6, a seventh lens L7, an eighth lens L8, and a ninth lens L9 are sequentially arranged from an object on the optical axis.

Table 5 below shows numerical data of the lenses constituting the lens system according to the third embodiment of the present invention.

TABLE 5

| Surface Number | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 2.0774 |
| 2 | Qcon Asphere | 2.9836 | 0.4836 | 544100.5600 | 1.8300 |
| Stop | Qcon Asphere | 2.8623 | 0.1000 | | 1.8430 |
| 4 | Qcon Asphere | 2.4850 | 0.8945 | 544100.5600 | 1.7885 |
| 5 | Qcon Asphere | 19.8221 | 0.1000 | | 1.6550 |
| 6 | Qcon Asphere | 22.3149 | 0.3500 | 670000.1940 | 1.5835 |
| 7 | Qcon Asphere | 6.4455 | 0.3223 | | 1.4805 |
| 8 | Qcon Asphere | 6.4663 | 0.3500 | 615000.2590 | 1.5227 |

TABLE 5-continued

| Surface Number | Surface Type | Y Radius | Thickness | Glass Code | Y Semi-Aperture |
|---|---|---|---|---|---|
| 9 | Qcon Asphere | 6.4552 | 0.1000 | | 1.6790 |
| 10 | Qcon Asphere | 96.8303 | 0.5794 | 535000.5600 | 1.8073 |
| 11 | Qcon Asphere | −62.8187 | 0.1733 | | 1.9281 |
| 12 | Qcon Asphere | −11.3843 | 0.3918 | 615000.2590 | 2.0808 |
| 13 | Qcon Asphere | −10.5509 | 0.1020 | | 2.2276 |
| 14 | Qcon Asphere | 20.2131 | 0.6116 | 615000.2390 | 2.3245 |
| 15 | Qcon Asphere | −25.5180 | 0.1328 | | 2.7068 |
| 16 | Qcon Asphere | 3.1701 | 0.4458 | 544100.5600 | 2.7828 |
| 17 | Qcon Asphere | 5.5326 | 0.7883 | | 3.2242 |
| 18 | Qcon Asphere | −35.5298 | 0.3500 | 535000.5600 | 3.8165 |
| 19 | Qcon Asphere | 2.7596 | 0.1457 | | 4.3000 |
| 20 | Sphere | Infinity | 0.1100 | BK7_SCHOTT | 4.7986 |
| 21 | Sphere | Infinity | 0.6862 | | 4.8381 |
| Image | Sphere | Infinity | 0.0000 | | 5.2500 |

As shown in FIG. 6, the first lens L1, the second lens L2, the third lens L3, the fourth lens L4, the fifth lens L5, the sixth lens L6, the seventh lens L7, the eighth lens L8, and the ninth lens L9 are sequentially arranged from the object, and the Qcon polynomial of each lens based on Qcon asphere thereof is represented by Mathematical Expression 1 above.

Qcon coefficients are obtained from Mathematical Expression 1 above as shown in Table 6 in FIG. 15.

According to the third embodiment of the present invention, the refractive power P1 of the first lens is |P1|=0.003, the number NVd40 of lenses having a variance constant of 40 or more is NVd40=5, a ratio of the distance TL from the center of the object-side surface of the first lens to the image surface to the image surface height ImagH is TL/ImagH=1.37, and the half field of view HFOV of the lens system is FOV=41.8°.

The radius of curvature R3 of the object-side surface of the second lens, the radius of curvature R4 of the image-side surface of the second lens, the radius of curvature R5 of the object-side surface of the third lens, and the radius of curvature R6 of the image-side surface of the third lens satisfy |(R3+R4)|/|(R5+R6)|=0.78, the minimum value CTm of the central thickness of the lens system satisfies CTm=0.35, and a ratio of the central thickness CT9 of the ninth lens to the edge thickness ET9 of the effective diameter of the ninth lens satisfies CT9/ET9=0.43.

In addition, the angle of incidence A92 of light incident on the edge of the effective diameter of the image-side surface of the ninth lens satisfies A92=6.0°, the focal distance f4 of the fourth lens, the focal distance f5 of the fifth lens, the focal distance f6 of the sixth lens, and the focal distance f7 of the seventh lens satisfy (|f5|+|f6|)/(|f4|+|f7|)=0.47, and Fno of the lens system satisfies Fno=1.52.

FIG. 7 is a view showing aberration according to a third embodiment of the present invention.

First data of FIG. 7 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the third embodiment of the present invention is 0.025 mm (focus) or less, which is determined to be good.

Second data of FIG. 7 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the third embodiment of the present invention is 0.025 mm (focus) or less, which is determined to be good.

Third data of FIG. 7 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the third embodiment of the present invention, is 2% or less, which is determined to be good.

Fourth Embodiment

FIG. 8 is a view showing a fourth embodiment of the high-resolution wide-angle lens system according to the present invention.

As shown, a first lens L1, a second lens L2, a third lens L3, a fourth lens L4, a fifth lens L5, a sixth lens L6, a seventh lens L7, an eighth lens L8, and a ninth lens L9 are sequentially arranged from an object on the optical axis.

Table 7 below shows numerical data of the lenses constituting the lens system according to the fourth embodiment of the present invention.

TABLE 7

| Surface Number | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 2.0783 |
| 2 | Qcon Asphere | 3.0536 | 0.4448 | 544100.5600 | 1.8795 |
| Stop | Qcon Asphere | 3.0142 | 0.1029 | | 1.8795 |
| 4 | Qcon Asphere | 2.6355 | 0.9642 | 544100.5600 | 1.8350 |
| 5 | Qcon Asphere | −54.5712 | 0.1000 | | 1.7029 |
| 6 | Qcon Asphere | −36.5511 | 0.3609 | 670000.1940 | 1.6240 |
| 7 | Qcon Asphere | 6.8760 | 0.3261 | | 1.4805 |
| 8 | Qcon Asphere | 11.5111 | 0.4293 | 615000.2590 | 1.4892 |
| 9 | Qcon Asphere | 26.6680 | 0.1000 | | 1.6675 |
| 10 | Qcon Asphere | −112.0658 | 0.4137 | 535000.5600 | 1.9118 |
| 11 | Qcon Asphere | 275.5777 | 0.2505 | | 1.9896 |
| 12 | Qcon Asphere | −10.8101 | 0.4283 | 544100.5600 | 2.1286 |
| 13 | Qcon Asphere | −9.2919 | 0.1021 | | 2.2617 |
| 14 | Qcon Asphere | 8.9670 | 0.5368 | 544100.5600 | 2.3832 |
| 15 | Qcon Asphere | 45.6405 | 0.1001 | | 2.7000 |
| 16 | Qcon Asphere | 3.2819 | 0.5448 | 544100.5600 | 2.7462 |

TABLE 7-continued

| Surface Number | Surface Type | Y Radius | Thickness | Glass Code | Y Semi-Aperture |
|---|---|---|---|---|---|
| 17 | Qcon Asphere | 4.7540 | 0.8419 | | 3.2645 |
| 18 | Qcon Asphere | −33.1450 | 0.5248 | 535000.5600 | 3.8386 |
| 19 | Qcon Asphere | 3.0271 | 0.1725 | | 4.2866 |
| 20 | Sphere | Infinity | 0.1100 | BK7_SCHOTT | 4.6445 |
| 21 | Sphere | Infinity | 0.5100 | | 4.6869 |
| Image | Sphere | Infinity | 0.0000 | | 4.9870 |

As shown in FIG. 8, the first lens L1, the second lens L2, the third lens L3, the fourth lens L4, the fifth lens L5, the sixth lens L6, the seventh lens L7, the eighth lens L8, and the ninth lens L9 are sequentially arranged from the object, and the Qcon polynomial of each lens based on Qcon asphere thereof is represented by Mathematical Expression 1 above.

Qcon coefficients are obtained from Mathematical Expression 1 above as shown in Table 8 in FIG. 16.

According to the fourth embodiment of the present invention, the refractive power P1 of the first lens is |P1|=0.007, the number NVd40 of lenses having a variance constant of 40 or more is NVd40=7, a ratio of the distance TL from the center of the object-side surface of the first lens to the image surface to the image surface height ImagH is TL/ImagH=1.48, and the half field of view HFOV of the lens system is FOV=39.8°.

The radius of curvature R3 of the object-side surface of the second lens, the radius of curvature R4 of the image-side surface of the second lens, the radius of curvature R5 of the object-side surface of the third lens, and the radius of curvature R6 of the image-side surface of the third lens satisfy |(R3+R4)|/|(R5+R6)|=1.75, the minimum value CTm of the central thickness of the lens system satisfies CTm=0.36, and a ratio of the central thickness CT9 of the ninth lens to the edge thickness ET9 of the effective diameter of the ninth lens satisfies CT9/ET9=0.42.

In addition, the angle of incidence A92 of light incident on the edge of the effective diameter of the image-side surface of the ninth lens satisfies A92=1.11°, the focal distance f4 of the fourth lens, the focal distance f5 of the fifth lens, the focal distance f6 of the sixth lens, and the focal distance f7 of the seventh lens satisfy (|f5|+|f6|)/(|f4|+|f7|)=5.0, and Fno of the lens system satisfies Fno=1.51.

FIG. 9 is a view showing aberration according to a fourth embodiment of the present invention.

First data of FIG. 9 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fourth embodiment of the present invention is 0.025 mm (focus) or less, which is determined to be good.

Second data of FIG. 9 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fourth embodiment of the present invention is 0.025 mm (focus) or less, which is determined to be good.

Third data of FIG. 9 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 10 is a view showing a fifth embodiment of the high-resolution wide-angle lens system according to the present invention.

As shown, a first lens L1, a second lens L2, a third lens L3, a fourth lens L4, a fifth lens L5, a sixth lens L6, a seventh lens L7, an eighth lens L8, and a ninth lens L9 are sequentially arranged from an object on the optical axis.

Table 9 below shows numerical data of the lenses constituting the lens system according to the fifth embodiment of the present invention.

TABLE 9

| Surface Number | Surface Type | Y Radius | Thickness | Glass Code | Y Semi-Aperture |
|---|---|---|---|---|---|
| Object | Sphere | Infinity | Infinity | | |
| 1 | Sphere | Infinity | 0.0000 | | 2.1181 |
| 2 | Qcon Asphere | 3.0054 | 0.4772 | 544100.5600 | 1.8795 |
| Stop | Qcon Asphere | 2.9685 | 0.0800 | | 1.8972 |
| 4 | Qcon Asphere | 2.5677 | 0.9124 | 544100.5600 | 1.8426 |
| 5 | Qcon Asphere | 31.4457 | 0.0500 | | 1.7107 |
| 6 | Qcon Asphere | 39.2047 | 0.3600 | 670000.1940 | 1.6579 |
| 7 | Qcon Asphere | 6.4727 | 0.3792 | | 1.4805 |
| 8 | Qcon Asphere | 9.4146 | 0.3843 | 615000.2590 | 1.5170 |
| 9 | Qcon Asphere | 10.9923 | 0.1000 | | 1.6937 |
| 10 | Qcon Asphere | 41.0365 | 0.3602 | 535000.5600 | 1.8869 |
| 11 | Qcon Asphere | 10.2651 | 0.2069 | | 1.9998 |
| 12 | Qcon Asphere | 79.8662 | 0.4485 | 544100.5600 | 2.1491 |
| 13 | Qcon Asphere | −9.6591 | 0.1068 | | 2.2584 |
| 14 | Qcon Asphere | 23.7259 | 0.6457 | 544100.5600 | 2.3723 |
| 15 | Qcon Asphere | −39.4875 | 0.1417 | | 2.7500 |
| 16 | Qcon Asphere | 3.1364 | 0.5163 | 544100.5600 | 2.9253 |
| 17 | Qcon Asphere | 5.1879 | 0.8052 | | 3.3570 |
| 18 | Qcon Asphere | −32.7155 | 0.3974 | 535000.5600 | 3.8749 |
| 19 | Qcon Asphere | 2.7750 | 0.1276 | | 4.2169 |
| 20 | Sphere | Infinity | 0.1100 | BK7_SCHOTT | 4.7834 |
| 21 | Sphere | Infinity | 0.6900 | | 4.8239 |
| Image | Sphere | Infinity | 0.0000 | | 5.2500 |

As shown in FIG. 10, the first lens L1, the second lens L2, the third lens L3, the fourth lens L4, the fifth lens L5, the sixth lens L6, the seventh lens L7, the eighth lens L8, and the ninth lens L9 are sequentially arranged from the object, and the Qcon polynomial of each lens based on Qcon asphere thereof is represented by Mathematical Expression 1 above.

Qcon coefficients are obtained from Mathematical Expression 1 above as shown in Table 10 in FIG. 17.

According to the fifth embodiment of the present invention, the refractive power P1 of the first lens is |P1|=0.008, the number NVd40 of lenses having a variance constant of 40 or more is NVd40=7, a ratio of the distance TL from the center of the object-side surface of the first lens to the image surface to the image surface height ImagH is TL/ImagH=1.39, and the half field of view HFOV of the lens system is FOV=41.9°.

The radius of curvature R3 of the object-side surface of the second lens, the radius of curvature R4 of the image-side surface of the second lens, the radius of curvature R5 of the object-side surface of the third lens, and the radius of curvature R6 of the image-side surface of the third lens satisfy |(R3+R4)|/|(R5+R6)|=0.74, the minimum value CTm of the central thickness of the lens system satisfies CTm=0.36, and a ratio of the central thickness CT9 of the ninth lens to the edge thickness ET9 of the effective diameter of the ninth lens satisfies CT9/ET9=0.51.

In addition, the angle of incidence A92 of light incident on the edge of the effective diameter of the image-side surface of the ninth lens satisfies A92=5.8°, the focal distance f4 of the fourth lens, the focal distance f5 of the fifth lens, the focal distance f6 of the sixth lens, and the focal distance f7 of the seventh lens satisfy (|f5|+|f6|)/(|f4|+|f7|)=0.33, and Fno of the lens system satisfies Fno=1.51.

FIG. 11 is a view showing aberration according to a fifth embodiment of the present invention.

First data of FIG. 11 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fifth embodiment of the present invention is 0.025 mm (focus) or less, which is determined to be good.

Second data of FIG. 11 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fifth embodiment of the present invention is 0.025 mm (focus) or less, which is determined to be good.

Third data of FIG. 11 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention relates to a high-resolution small wide-angle lens system including a first lens, a second lens, a third lens, a fourth lens, a fifth lens, a sixth lens, a seventh lens, an eighth lens, and a ninth lens arranged from an object along an optical axis, wherein distortion of the small wide-angle lens system is corrected while the small wide-angle lens system is small and lightweight by appropriately designing the refractive powers, shapes, etc. of the lenses, wherein TTL is short even though the small wide-angle lens system has a large field of view, whereby the high-resolution small wide-angle lens system is easily applicable to a thin or small camera module, particularly a smartphone.

Also, in the present invention, TTL is short even though the nine lenses are used, whereby it is possible to provide a small, thin camera module, and the refractive power P1 of the first lens satisfies |P1|<0.01, whereby an effective diameter of the first lens may be reduced, and therefore a camera opening may be reduced. Consequently, it is possible to provide a small lens system.

Also, in the present invention, Fno is small, whereby the diameter of a stop may be increased. Consequently, a bright image may be realized even in the dark, and therefore it is possible to provide a high-resolution, high-performance small wide-angle lens system.

In addition, the angle of incidence A92 of light incident on the edge of an effective diameter of an image-side surface of the ninth lens is set to be smaller than 12°, whereby total internal reflection (lens flare) may be improved, and therefore it is possible to provide a high-resolution, high-quality small wide-angle lens system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small wide-angle lens system comprising a first lens, a second lens, a third lens, a fourth lens, a fifth lens, a sixth lens, a seventh lens, an eighth lens, and a ninth lens sequentially arranged from an object, wherein
    the first lens has a convex object-side surface,
    the third lens has a negative refractive power,
    the fourth lens has a concave image-side surface,
    the sixth lens has a concave object-side surface and a concave image-side surface,
    the ninth lens has a negative refractive power and a concave object-side surface,
    all surfaces of the first to ninth lenses are aspherical surfaces,
    a refractive power P1 of the first lens satisfies |P1|<0.01, and
    Fno of the lens system satisfies Fno<1.6.

2. The small wide-angle lens system according to claim 1, wherein a minimum value CTm of a central thickness of the lens system satisfies CTm≤0.4.

3. The small wide-angle lens system according to claim 1, wherein a ratio of a central thickness CT9 of the ninth lens to an edge thickness ET9 of an effective diameter of the ninth lens satisfies 0.15<CT9/ET9<1.0.

4. The small wide-angle lens system according to claim 1, wherein a half field of view HFOV of the lens system satisfies 38°<HFOV<50°.

5. The small wide-angle lens system according to claim 1, wherein, assuming that an angle of incidence of light incident on an edge of an effective diameter of an image-side surface of the ninth lens is A92, A92 satisfies A92<12°.

6. The small wide-angle lens system according to claim 1, wherein a focal distance f4 of the fourth lens, a focal distance f5 of the fifth lens, a focal distance f6 of the sixth lens, and a focal distance f7 of the seventh lens satisfy (|f5|+|f6|)/(|f4|+|f7|)<7.

7. The small wide-angle lens system according to claim 1, wherein at least one inflection point is provided at the object-side surface and an image-side surface of the first lens.

8. The small wide-angle lens system according to claim 1, wherein the number NVd40 of lenses having a variance constant of 40 or more satisfies NVd40≥3.

9. The small wide-angle lens system according to claim 1, wherein a radius of curvature R3 of an object-side surface of the second lens, a radius of curvature R4 of an image-side surface of the second lens, a radius of curvature R5 of an object-side surface of the third lens, and a radius of curvature R6 of an image-side surface of the third lens satisfy 0.5<|(R3+R4)|/|(R5+R6)|<2.0.

10. The small wide-angle lens system according to claim 1, wherein a ratio of a distance TL from a center of the object-side surface of the first lens to an image surface to an image surface height ImagH satisfies TL/ImagH<1.7.

11. A small wide-angle lens system comprising a first lens, a second lens, a third lens, a fourth lens, a fifth lens, a sixth lens, a seventh lens, an eighth lens, and a ninth lens sequentially arranged from an object, wherein
a stop is located between the first lens and the second lens,
the first lens has a convex object-side surface,
the third lens has a negative refractive power and a concave image-side surface,
the fifth lens has a negative refractive power, a concave object-side surface, and a convex image-side surface,
the sixth lens has a concave object-side surface and a concave image-side surface,
the ninth lens has a negative refractive power and a concave object-side surface,
all surfaces of the first to ninth lenses are aspherical surfaces,
a refractive power P1 of the first lens satisfies |P1|<0.01, and
assuming that an angle of incidence of light incident on an edge of an effective diameter of an image-side surface of the ninth lens is A92, A92 satisfies A92<12°.

12. The small wide-angle lens system according to claim 11, wherein Fno of the lens system satisfies Fno<1.6.

13. The small wide-angle lens system according to claim 11, wherein a radius of curvature R3 of an object-side surface of the second lens, a radius of curvature R4 of an image-side surface of the second lens, a radius of curvature R5 of an object-side surface of the third lens, and a radius of curvature R6 of the image-side surface of the third lens satisfy 0.5<|(R3+R4)|/|(R5+R6)|<2.0.

14. The small wide-angle lens system according to claim 11, wherein a ratio of a distance TL from a center of the object-side surface of the first lens to an image surface to an image surface height ImagH satisfies TL/ImagH<1.7.

15. The small wide-angle lens system according to claim 11, wherein at least one inflection point is provided at the object-side surface and an image-side surface of the first lens.

16. The small wide-angle lens system according to claim 11, wherein the number NVd40 of lenses having a variance constant of 40 or more satisfies NVd40≥3.

17. The small wide-angle lens system according to claim 11, wherein a minimum value CTm of a central thickness of the lens system satisfies CTm≤0.4.

18. The small wide-angle lens system according to claim 11, wherein a half field of view HFOV of the lens system satisfies 38°<HFOV<50°.

19. The small wide-angle lens system according to claim 11, wherein a ratio of a central thickness CT9 of the ninth lens to an edge thickness ET9 of an effective diameter of the ninth lens satisfies 0.15<CT9/ET9<1.0.

20. The small wide-angle lens system according to claim 11, wherein a focal distance f4 of the fourth lens, a focal distance f5 of the fifth lens, a focal distance f6 of the sixth lens, and a focal distance f7 of the seventh lens satisfy (|f5|+|f6|)/(|f4|+|f7|)<7.

* * * * *